(12) United States Patent
Joseph, III et al.

(10) Patent No.: US 10,953,341 B2
(45) Date of Patent: Mar. 23, 2021

(54) SOLAR POWERED WATER PURIFICATION SYSTEM

(75) Inventors: Thomas A. Joseph, III, New Castle, PA (US); Charles Christopher Newton, Lompoc, CA (US); Henry Maurice Wandrie, III, Irvine, CA (US); Matthew Carter, Aurora, IL (US)

(73) Assignee: Epiphany Solar Water Systems, New Castle, PA (US)

( * ) Notice: Subject to any disclaimer, the term of this patent is extended or adjusted under 35 U.S.C. 154(b) by 702 days.

(21) Appl. No.: 13/496,951

(22) PCT Filed: Sep. 21, 2010

(86) PCT No.: PCT/US2010/049603
§ 371 (c)(1),
(2), (4) Date: May 30, 2012

(87) PCT Pub. No.: WO2011/035283
PCT Pub. Date: Mar. 24, 2011

(65) Prior Publication Data
US 2012/0228114 A1 Sep. 13, 2012

Related U.S. Application Data

(60) Provisional application No. 61/363,877, filed on Jul. 13, 2010, provisional application No. 61/244,314, filed on Sep. 21, 2009.

(51) Int. Cl.
*B01D 1/00* (2006.01)
*B01D 1/16* (2006.01)
(Continued)

(52) U.S. Cl.
CPC ............. *B01D 1/0035* (2013.01); *B01D 1/16* (2013.01); *C02F 1/14* (2013.01); *B01D 3/02* (2013.01);
(Continued)

(58) Field of Classification Search
CPC ........... C02F 1/14; B01D 1/16; B01D 5/0018; B01D 1/0035; B01D 5/0066; B01D 5/006; B01D 3/02; B01D 1/0029; F24S 23/71
(Continued)

(56) References Cited

U.S. PATENT DOCUMENTS

| | | | | |
|---|---|---|---|---|
| 313,163 A | * | 3/1885 | Berry | ................... B01D 5/0066 202/190 |
| 509,282 A | * | 11/1893 | Beck | ................... B01D 5/0066 202/191 |

(Continued)

FOREIGN PATENT DOCUMENTS

| DE | 29620639 U1 | 1/1997 |
|---|---|---|
| DE | 29521272 U1 | 2/1997 |

(Continued)

OTHER PUBLICATIONS

Boyle, Rebecca, "What Comes After Hubble?", Popular Science, May 6, 2009. Avaialble online at: https://www.popsci.com/military-aviation-amp-space/article/2009-05/what-comes-after-hubble.*

(Continued)

*Primary Examiner* — Jonathan Luke Pilcher
(74) *Attorney, Agent, or Firm* — The Webb Law Firm

(57) ABSTRACT

A distillation unit for producing potable water using solar radiation is disclosed. The distillation unit includes a heating chamber defining an interior chamber adapted to contain a non-potable liquid for distillation, and a dome-shaped condensing portion having an inner surface and an outer surface, (Continued)

with the condensing portion disposed over the heating chamber such that the heating chamber and the inner surface of the condensing portion are provided in fluid-transfer communication. The distillation unit also includes a pre-heat jacket having a first surface and a second surface and an interior defined therebetween adapted to receive non-potable liquid for distillation therein. The first surface is disposed adjacent the outer surface of the condensing portion, and the pre-heat jacket defines an access entry for introducing non-potable liquid for distillation into the interior of the heating chamber. The distillation unit also includes a trough adjacent for receiving a potable liquid therein.

35 Claims, 21 Drawing Sheets

(51) Int. Cl.
*C02F 1/14* (2006.01)
*B01D 5/00* (2006.01)
*B01D 3/02* (2006.01)
*C02F 103/08* (2006.01)

(52) U.S. Cl.
CPC ........ B01D 5/0066 (2013.01); C02F 2103/08 (2013.01); Y02A 20/124 (2018.01); Y02A 20/211 (2018.01); Y02A 20/212 (2018.01); Y02W 10/37 (2015.05)

(58) Field of Classification Search
USPC ........................................ 202/163, 190, 192
See application file for complete search history.

(56) References Cited

U.S. PATENT DOCUMENTS

| | | | |
|---|---|---|---|
| 687,262 A * | 11/1901 | Powers ..................... C02F 1/14 |
| | | | 202/192 |
| 734,486 A | 7/1903 | Wilson | |
| 744,367 A | 11/1903 | De Lautreppe | |
| 1,445,134 A | 2/1923 | Fowler | |
| 2,460,482 A | 2/1949 | Abbot | |
| 2,909,171 A | 10/1959 | Lof | |
| 3,390,056 A | 6/1968 | Ingram | |
| 3,415,719 A | 12/1968 | Telkes | |
| 3,775,257 A | 11/1973 | Lovrich | |
| 3,801,474 A | 4/1974 | Castellucci et al. | |
| 3,870,605 A | 3/1975 | Sakamoto | |
| 3,905,352 A * | 9/1975 | Jahn ..................... G01S 3/7861 |
| | | | 126/578 |
| 3,998,206 A * | 12/1976 | Jahn ..................... G01S 3/7861 |
| | | | 126/578 |
| 4,075,063 A * | 2/1978 | Tsay et al. ..................... 202/234 |
| 4,089,750 A | 5/1978 | Kirschman et al. | |
| 4,135,985 A | 1/1979 | La Rocca | |
| 4,194,949 A * | 3/1980 | Stark ........................... 202/180 |
| 4,209,363 A | 6/1980 | Ramer | |
| 4,219,387 A | 8/1980 | Gruntman | |
| 4,249,515 A | 2/1981 | Page | |
| 4,252,107 A * | 2/1981 | Horton .................. F24S 30/452 |
| | | | 126/605 |
| 4,312,709 A | 1/1982 | Stark et al. | |
| 4,318,781 A * | 3/1982 | Iida ........................... C02F 1/14 |
| | | | 202/173 |
| 4,325,788 A | 4/1982 | Snyder | |
| 4,329,205 A | 5/1982 | Tsumara et al. | |
| 4,371,623 A | 2/1983 | Taylor | |
| 4,373,996 A | 2/1983 | Maruko | |
| 4,377,441 A | 3/1983 | Kimmell et al. | |
| 4,498,959 A | 2/1985 | Sakamoto | |
| 4,525,242 A | 6/1985 | Iida | |
| 4,536,258 A | 8/1985 | Huhta-Koivisto | |
| 4,568,156 A | 2/1986 | Dane | |
| 4,612,914 A | 9/1986 | Dogey | |
| 4,664,751 A | 5/1987 | Lloyd | |
| 4,687,550 A | 8/1987 | Wong | |
| 4,756,802 A * | 7/1988 | Finney ........................ 202/172 |
| 4,921,580 A * | 5/1990 | Martes ..................... B01D 3/10 |
| | | | 202/205 |
| 4,959,127 A * | 9/1990 | Michna ................. B01D 5/0066 |
| | | | 159/48.1 |
| 5,053,110 A * | 10/1991 | Deutsch .................... B01D 3/02 |
| | | | 159/903 |
| 5,181,991 A * | 1/1993 | Deutsch ......................... 202/176 |
| 5,348,622 A * | 9/1994 | Deutsch .................... B01D 3/42 |
| | | | 202/176 |
| 5,628,879 A | 5/1997 | Woodruff | |
| 5,645,693 A | 7/1997 | Gode | |
| 5,650,050 A | 7/1997 | Kaufmann | |
| 5,744,008 A | 4/1998 | Craven | |
| 5,932,074 A | 8/1999 | Hoiss | |
| 6,001,222 A | 12/1999 | Klein | |
| 6,663,750 B1 | 12/2003 | Coon | |
| 6,767,433 B2 | 7/2004 | Foster et al. | |
| 6,797,124 B2 | 9/2004 | Ludwig | |
| 6,897,832 B2 | 5/2005 | Essig, Jr. et al. | |
| 7,067,044 B1 | 6/2006 | Coon | |
| 7,153,395 B2 | 12/2006 | Foster et al. | |
| 7,264,695 B2 | 9/2007 | Foster et al. | |
| 7,296,410 B2 * | 11/2007 | Litwin .................... F03G 6/065 |
| | | | 60/641.12 |
| 7,507,316 B2 | 3/2009 | Ward | |
| 7,955,478 B2 * | 6/2011 | McClure .............. B01D 1/0035 |
| | | | 159/27.1 |
| 8,246,786 B2 * | 8/2012 | Cap ...................... B01D 1/0035 |
| | | | 202/82 |
| 2002/0139656 A1 | 10/2002 | Reid | |
| 2002/0179425 A1 | 12/2002 | Dableh | |
| 2003/0150704 A1 | 8/2003 | Posada | |
| 2005/0126170 A1* | 6/2005 | Litwin .................... F03G 6/065 |
| | | | 60/641.8 |
| 2007/0062799 A1 | 3/2007 | Lee | |
| 2007/0090202 A1 | 4/2007 | Hsia | |
| 2007/0108038 A1 | 5/2007 | Lee et al. | |
| 2008/0073198 A1 | 3/2008 | Simon | |
| 2008/0164135 A1 | 7/2008 | Slook | |
| 2008/0190755 A1 | 8/2008 | McClure | |

FOREIGN PATENT DOCUMENTS

| | | |
|---|---|---|
| DE | 202004003380 U1 | 7/2004 |
| DE | 102004025189 A1 | 2/2005 |
| FR | 536920 A | 5/1922 |
| FR | 1016406 A | 11/1952 |
| JP | 10504998 T | 5/1998 |
| JP | 2004160301 A | 6/2004 |

OTHER PUBLICATIONS

"Mylar Bags", Sorbentsystems, Dec. 21, 2007 (date obtained from wayback machine). Available online at: https://www.sorbentsystems.com/mylar.html.*

"What is mylar", Sorbentsystems. Available online at: https://www.sorbentsystems.com/mylarinfo.html.*

Fedkin et al. "2.4 Concentration with a Parabolic Reflector", PennState. Available online at: https://www.e-education.psu.edu/eme812/node/557.*

* cited by examiner

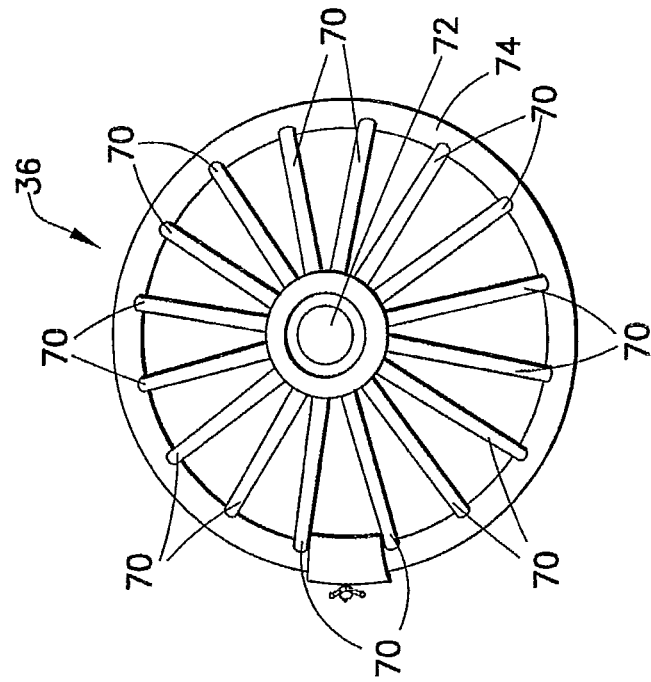
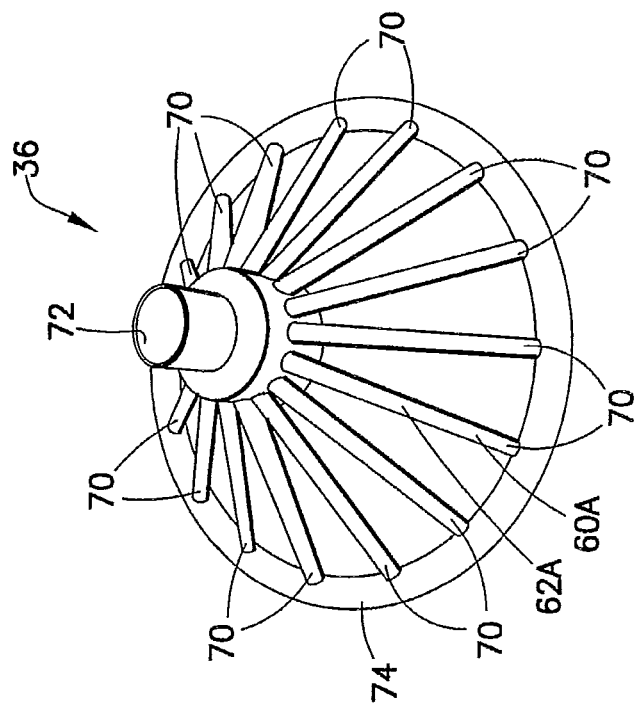

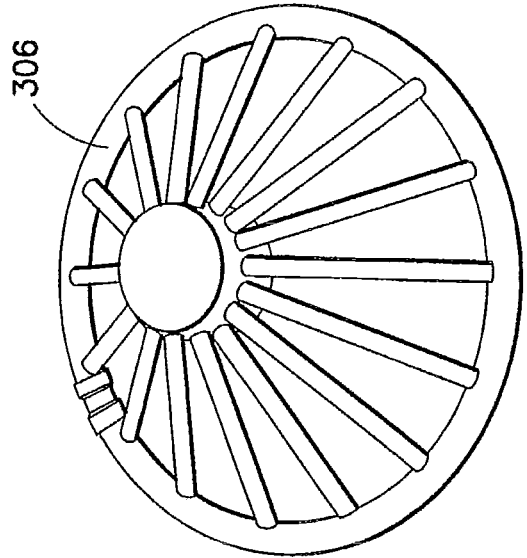
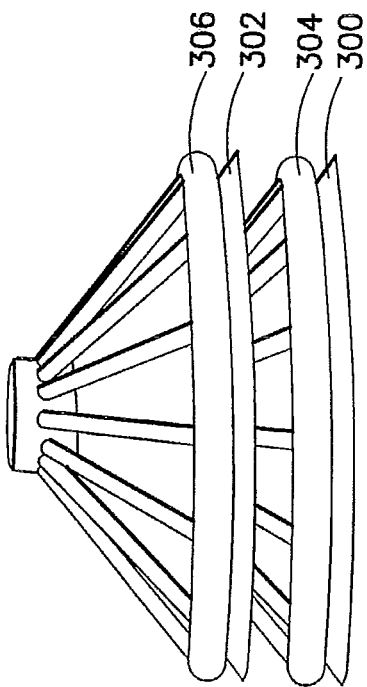
FIG.16
FIG.14
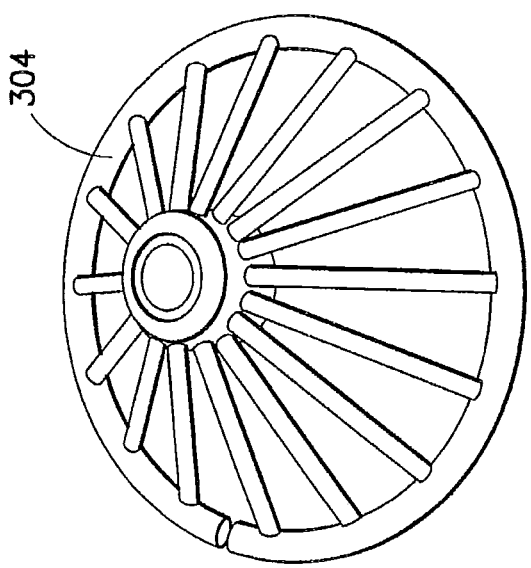
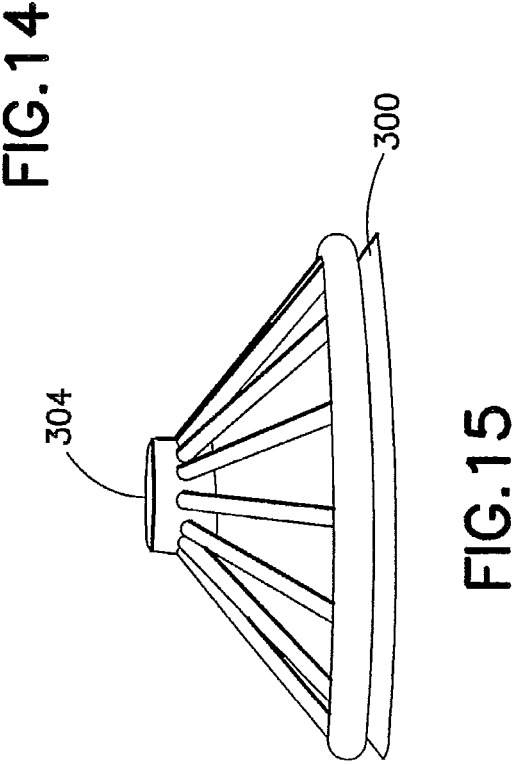
FIG.15

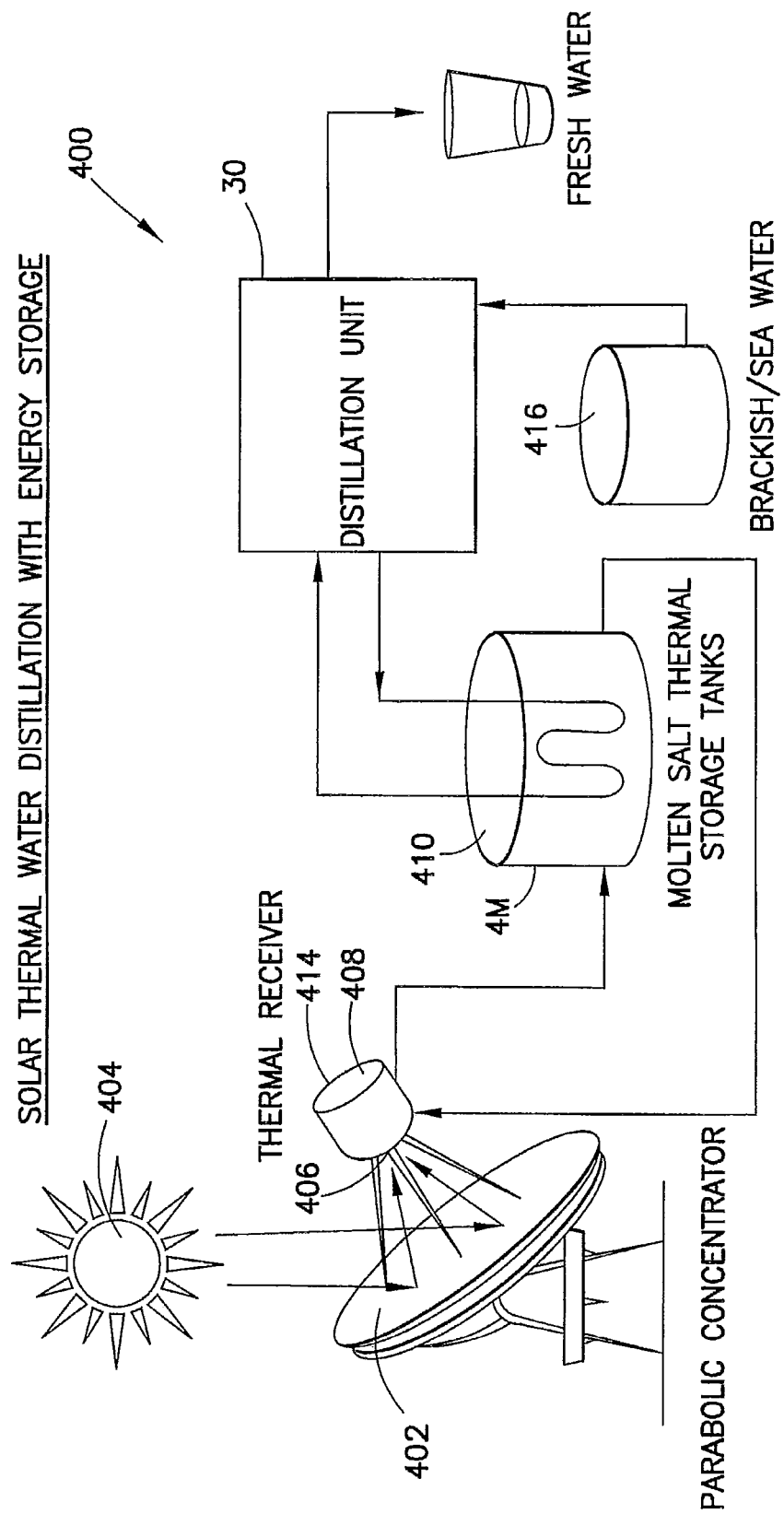

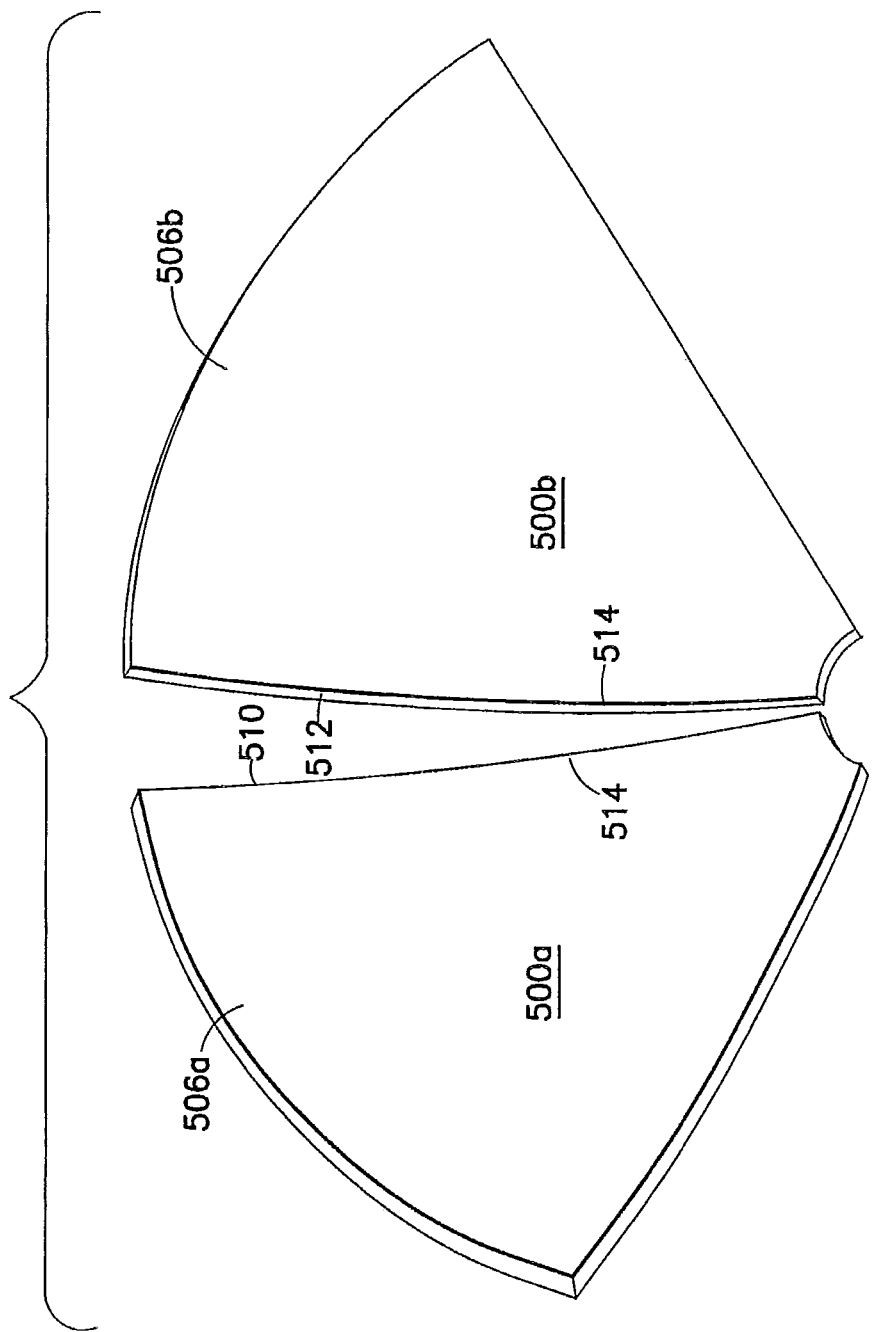

SOLAR POWERED WATER PURIFICATION SYSTEM

CROSS-REFERENCE TO RELATED APPLICATIONS

The present application claims priority to U.S. Provisional Application No. 61/244,314 entitled "Solar Powered Water Purification System" filed Sep. 21, 2009 and U.S. Provisional Application No. 61/363,877 entitled "Solar Powered Water Purification System" filed Jul. 13, 2010, the entire disclosures of each of which are herein incorporated by reference.

BACKGROUND OF THE INVENTION

Field of the Invention

The present invention is directed to a solar powered water purification system and, more particularly, is directed to a high efficiency water purification system that is powered by concentrated solar generated thermal energy.

Description of Related Art

Conventional systems for producing potable drinking water from salt water by means of solar distillation typically include a material transparent to solar radiation disposed over a pool of salt water in such a fashion as to allow the radiant energy to heat and vaporize the salt water. The resulting vapor subsequently condenses and coalesces into a body of distilled potable water. Other conventional systems for producing potable drinking water include a receptacle for containing a quantity of liquid to be distilled, such as salt water or brine, and a covering made of a material transparent to solar radiation that is suspended over the liquid. The covering typically includes portions sloping downwardly toward the side surfaces of the receptacle and is adapted to permit the passage of solar radiation into the receptacle in order to raise the temperature of the salt water or brine to vaporize the liquid. However, conventional systems are largely inefficient and slow to operate making them inadequately adapted for large-scale implementation.

Sufficient potable drinking water is not currently available to more than half of the world's population. However, as most of the world's population has access to vast sources of impure or non-potable water, such as oceans, lakes, rivers, wells, or other underground water sources, a need exists for a distillation system that utilizes an available source of non-potable water and a renewable solar energy source to provide, in an efficient manner, potable drinking water for large-scale implementation.

As a significant portion of the world's population suffers from a lack of potable water, a further need exists for a distillation system that provides an affordable, easy-to-use, highly reliable and convenient way to purify non-potable sources of water. Existing water purification technologies, including reverse osmosis and mechanical filtration, are expensive and require significant energy resources to operate, as well as continual maintenance. Accordingly, a further need exists for a distillation system that reduces associated maintenance, costs, and related operational expenses.

SUMMARY OF THE INVENTION

In accordance with an embodiment of the present invention, a distillation unit includes a heating chamber having a first end and a second end and a sidewall extending therebetween defining an interior adapted to contain a non-potable liquid for distillation. The distillation unit also includes a dome-shaped condensing portion having an inner surface and an outer surface, the condensing portion disposed over the first end of the heating chamber, wherein the first end of the heating chamber and the inner surface of the condensing portion are provided in fluid-transfer communication. The distillation unit further includes a pre-heat jacket having a first surface and a second surface and an interior defined therebetween adapted to receive non-potable liquid for distillation therein. The first surface of the pre-heat jacket is disposed adjacent the outer surface of the condensing portion, with the pre-heat jacket defining an access entry for introducing non-potable liquid for distillation into the interior of the heating chamber. The distillation unit further includes a trough adjacent the first open end of the heating chamber for receiving a potable liquid therein.

At least a portion of the heating chamber may be adapted to receive heat from concentrated solar energy. In certain configurations, at least a portion of the heating chamber is adapted to transfer heat received from concentrated solar energy to the non-potable liquid contained therein, with the heating chamber vaporizing at least a portion of the non-potable liquid to form a purified vapor. The inner surface of the condensing portion may be adapted to receive the purified vapor thereon and to condense the purified vapor into the potable liquid. The potable liquid may be directed into the trough for expelling the potable liquid from the distillation unit.

In one configuration, the non-potable liquid disposed within the interior of the pre-heat jacket has a temperature that is lower than the temperature of the outer surface of the condensing portion. The heating chamber may further include a vapor directional structure having a first portion in communication with the non-potable liquid, and a second portion adjacent the inner surface of the condensing portion for directing at least a portion of the purified vapor to the inner surface of the condensing portion. The heating chamber may also include a waste outlet for expelling a portion of the non-potable liquid therefrom.

The pre-heat jacket of the distillation unit may further include an inlet in fluid communication with a source of non-potable liquid. The first surface of the pre-heat jacket may be adapted to receive excess heat from the outer surface of the condensing portion and to transfer the excess heat to the non-potable liquid disposed within the interior of the pre-heat jacket. The transfer of excess heat to the non-potable liquid disposed within the interior of the pre-heat jacket may increase the rate of condensation of the purified vapor of the inside surface of the condensing portion. As the non-potable liquid disposed within the pre-heat jacket approaches the boiling point, it may be directed through the access entry.

In certain configurations, the distillation unit may further include a second pre-heat jacket having a first surface and a second surface and an interior defined therebetween adapted to receive a non-potable liquid for distillation therein. The first surface may be disposed adjacent the second surface of the pre-heat jacket. The second pre-heat jacket may define a second access entry for introducing non-potable liquid for distillation into the interior of the heating chamber. The second pre-heat jacket may be adapted to capture excess heat from the pre-heat jacket and to transfer the excess heat to the non-potable liquid disposed within the interior of the second pre-heat jacket.

In accordance with another embodiment of the present invention, a distillation unit includes a heating chamber having a first end and a second end and a sidewall extending therebetween defining an interior adapted to contain a non-potable liquid for distillation. The distillation unit also includes a dome-shaped condensing portion having an inner surface and an outer surface, with the condensing portion disposed over the first end of the heating chamber. The first end of the heating chamber and the inner surface of the condensing portion may be provided in fluid-transfer communication. The distillation unit further includes a pre-heat jacket having a first surface and a second surface and an interior defined therebetween adapted to receive non-potable liquid for distillation therein, with the first surface disposed adjacent the outer surface of the condensing portion. The pre-heat jacket may define an access entry for introducing non-potable liquid for distillation into the interior of the heating chamber. The distillation unit may also include a second dome-shaped condensing portion having an inner surface and an outer surface, with the second condensing portion provided in fluid-transfer communication with the heating chamber. Further the distillation unit may also include a second pre-heat jacket having a first surface and a second surface and an interior defined therebetween adapted to receive non-potable liquid for distillation therein, with the first surface disposed adjacent the second surface of the pre-heat jacket and adjacent the outer surface of the second condensing portion. The second pre-heat jacket may define an access entry for introducing non-potable liquid for distillation into the interior of the heating chamber. The distillation unit may also include a trough adjacent the first open end of the heating chamber for receiving a potable liquid therein.

In accordance with certain configurations, the second pre-heat jacket may be adapted to receive excess heat from the pre-heat jacket and to transfer the excess heat to the non-potable liquid disposed within the second pre-heat jacket.

In accordance with yet another embodiment of the present invention, a distillation unit may include a heating chamber having a first end and a second end and a sidewall extending therebetween defining an interior adapted to contain a non-potable liquid for distillation. The distillation unit also includes a dome-shaped condensing portion having an inner surface and an outer surface, the condensing portion disposed over the first end of the heating chamber, with the first end of the heating chamber and the inner surface of the condensing portion provided in fluid-transfer communication. The distillation unit further includes a second dome-shaped condensing portion having an inner surface and an outer surface, with the second condensing portion provided in fluid-transfer communication with the heating chamber. The distillation unit may further include means for introducing non-potable liquid to at least one of the condensing portion and the second condensing portion, and a trough adjacent the first open end of the heating chamber for receiving a potable liquid therein.

In accordance with yet another embodiment of the present invention, a distillation system includes a concentrator adapted to receive and concentrate solar radiation from the sun and capture heat therefrom, with the concentrator having a focal point. The distillation system also includes a distillation unit positioned at the focal point of the concentrator. The distillation unit includes a heating chamber having a first end and a second end and a sidewall extending therebetween defining an interior adapted to contain a non-potable liquid for distillation, with at least a portion of the heating chamber adapted to receive heat from the concentrator. The distillation unit also includes a dome-shaped condensing portion having an inner surface and an outer surface, the condensing portion disposed over the first end of the heating chamber, with the first end of the heating chamber and the inner surface of the condensing portion provided in fluid-transfer communication. The distillation unit also includes a pre-heat jacket having a first surface and a second surface and an interior defined therebetween adapted to receive non-potable liquid for distillation therein, with the first surface disposed adjacent the outer surface of the condensing portion. The pre-heat jacket may define an access entry for introducing non-potable liquid for distillation into the interior of the heating chamber. The distillation unit may also include a trough adjacent the first open end of the heating chamber for receiving a potable liquid therein.

At least a portion of the heating chamber may be adapted to transfer heat to the non-potable liquid contained therein, with the heating chamber vaporizing at least a portion of the non-potable liquid to form a purified vapor. The inner surface of the condensing portion may be adapted to receive the purified vapor thereon and to condense the purified vapor into the potable liquid. The potable liquid may be directed into the trough for expelling the potable liquid from the distillation unit.

Optionally, the distillation system may also include a sun tracking system for determining the relative position of the sun and means for directing the concentrator toward the sun. The concentrator may also include a solar receiver for converting solar radiation into heat integrated into a portion of the heating chamber. In certain configurations, the distillation unit may also include a second dome-shaped condensing portion having an inner surface and an outer surface, with the second condensing portion provided in fluid-transfer communication with the heating chamber. The distillation unit may further include a second pre-heat jacket having a first surface and a second surface and an interior defined therebetween adapted to receive non-potable liquid for distillation therein, with the first surface disposed adjacent the second surface of the pre-heat jacket and adjacent the outer surface of the second condensing portion. The second pre-heat jacket may define an access entry for introducing non-potable liquid for distillation into the interior of the heating chamber. The second pre-heat jacket may be adapted to receive excess heat from the pre-heat jacket and to transfer the excess heat to the non-potable liquid disposed within the second pre-heat jacket.

Alternatively, the distillation unit may include a second dome-shaped condensing portion having an inner surface and an outer surface, with the second condensing portion provided in fluid-transfer communication with the heating chamber, and a second pre-heat jacket having a first surface and a second surface, with the first surface disposed adjacent the second surface of the pre-heat jacket and adjacent the outer surface of the second condensing portion. The distillation unit may also include means for introducing non-potable liquid to at least one of the second surface of the pre-heat jacket and the second surface of the second pre-heat jacket, and means for directing non-potable liquid from at least one of the second surface of the pre-heat jacket and the second surface of the second pre-heat jacket to the heating chamber.

The distillation system may further include a concentrator that is formed of a plurality of segments. The concentrator may be formed of a plurality of interlocking segments. Optionally, the segments may be formed of a supportive dish segment and a reflective surface segment. The reflective surface segment may be back-coated by aluminized vapor deposition.

In accordance with yet a further embodiment of the present invention, a distillation system includes a concentrator adapted to receive and concentrate solar radiation from the sun and capture heat therefrom, the concentrator having a focal point, and a distillation unit remote from the focal point of the concentrator. The distillation unit includes a heating chamber having a first end and a second end and a sidewall extending therebetween defining an interior adapted to contain a non-potable liquid for distillation. The distillation unit also includes a dome-shaped condensing portion having an inner surface and an outer surface, with the condensing portion disposed over the first end of the heating chamber. The first end of the heating chamber and the inner surface of the condensing portion are provided in fluid-transfer communication. The distillation unit also includes a pre-heat jacket having a first surface and a second surface and an interior defined therebetween adapted to receive non-potable liquid for distillation therein, with the first surface disposed adjacent the outer surface of the condensing portion. The pre-heat jacket may define an access entry for introducing non-potable liquid for distillation into the interior of the heating chamber. The distillation unit may also include a trough adjacent the first open end of the heating chamber for receiving a potable liquid therein, and a thermal transfer system at least partially positioned at the focal point. The thermal transfer system may be adapted for receiving solar radiation from the sun and converting the solar radiation into heat, storing at least a portion of the heat, and directing a portion of the stored heat to the heating chamber.

The distillation system may also include a sun tracking system for determining the relative position of the sun and means for directing the concentrator toward the sun. The thermal transfer system may include at least one of a sodium vapor receiver and a hot oil system for converting solar radiation into heat and storing at least a portion of the heat. The thermal transfer system may further include a reservoir for storing the heat, and a circulation loop for transferring the stored heat to the heating chamber.

Optionally, the distillation unit of the distillation system may include a second dome-shaped condensing portion having an inner surface and an outer surface, with the second condensing portion provided in fluid-transfer communication with the heating chamber. The distillation system may also include a second pre-heat jacket having a first surface and a second surface and an interior defined therebetween adapted to receive non-potable liquid for distillation therein, with the first surface disposed adjacent the second surface of the pre-heat jacket and adjacent the outer surface of the second condensing portion. The second pre-heat jacket may define an access entry for introducing non-potable liquid for distillation into the interior of the heating chamber. The second pre-heat jacket may be adapted to receive excess heat from the pre-heat jacket and to transfer the excess heat to the non-potable liquid disposed within the second pre-heat jacket.

Alternatively, the distillation unit of the distillation system may include a second dome-shaped condensing portion having an inner surface and an outer surface, with the second condensing portion provided in fluid-transfer communication with the heating chamber. The distillation unit may further include a second pre-heat jacket having a first surface and a second surface, the first surface disposed adjacent the second surface of the pre-heat jacket and adjacent the outer surface of the second condensing portion. The distillation unit may also include means for introducing non-potable liquid to at least one of the second surface of the pre-heat jacket and the second surface of the second pre-heat jacket, and means for directing non-potable liquid from at least one of the second surface of the pre-heat jacket and the second surface of the second pre-heat jacket to the heating chamber.

The distillation system may further include a concentrator that is formed of a plurality of segments. The concentrator may be formed of a plurality of interlocking segments. Optionally, the segments may be formed of a supportive dish segment and a reflective surface segment. The reflective surface segment may be back-coated by aluminized vapor deposition.

In accordance with another embodiment of the present invention, a concentrator is formed of a plurality of interlocking segments, wherein the segments are formed of a supportive dish segment and a reflective surface segment.

In accordance with yet another embodiment of the present invention, a distillation system includes a concentrator adapted to receive and concentrate solar radiation from the sun and capture heat therefrom, the concentrator defining a center hole therein and having a focal point coincident with the center hole, and a distillation unit positioned at the focal point of the concentrator.

The concentrator of the distillation unit may be formed of a plurality of segments. The distillation unit may also include a heating chamber having a first end and a second end and a sidewall extending therebetween defining an interior adapted to contain a non-potable liquid for distillation, with at least a portion of the heating chamber adapted to receive heat from the concentrator. The distillation unit may also include a dome-shaped condensing portion having an inner surface and an outer surface, with the condensing portion disposed over the first end of the heating chamber, wherein the first end of the heating chamber and the inner surface of the condensing portion are provided in fluid-transfer communication. The distillation unit may further include a pre-heat jacket having a first surface and a second surface and an interior defined therebetween adapted to receive non-potable liquid for distillation therein, with the first surface disposed adjacent the outer surface of the condensing portion, the pre-heat jacket defining an access entry for introducing non-potable liquid for distillation into the interior of the heating chamber.

BRIEF DESCRIPTION OF THE DRAWINGS

FIG. 9 is a photographic representation of a perspective view of a pre-heat jacket in accordance with an embodiment of the present invention.

FIG. 10 is a photographic representation of the top view of the pre-heat jacket of FIG. 9 in accordance with an embodiment of the present invention.

FIG. 14 is a photographic side view representation of a pre-heat jacket and a second pre-heat jacket in accordance with an embodiment of the present invention.

FIG. 15 is a photographic side view representation of the pre-heat jacket of FIG. 14 disposed over the condensing portion of FIG. 13 in accordance with an embodiment of the present invention.

FIG. 16 is a photographic side view representation of the pre-heat jacket of FIG. 14 disposed over the condensing portion of FIG. 13 with the second pre-heat jacket of FIG. 14 disposed over the second condensing portion of FIG. 13 with the second condensing portion of FIG. 13 disposed over the pre-heat jacket of FIG. 14 in accordance with an embodiment of the present invention.

FIG. 19 is a schematic representation of a distillation system in accordance with an embodiment of the present invention.

FIG. 20E is a perspective view of a plurality of interlocking segments in accordance with an embodiment of the present invention.

DETAILED DESCRIPTION

Figure 1:
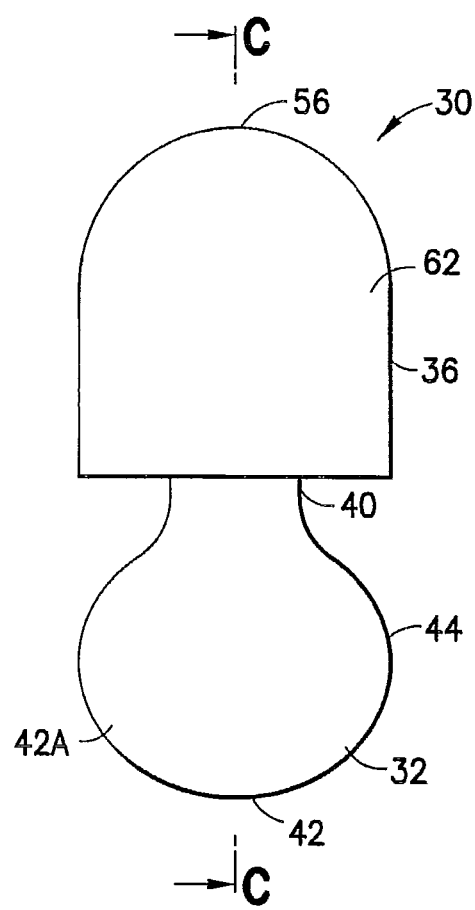
FIG. 1 is a schematic front view of a distillation unit in accordance with an embodiment of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The distillation unit 30 of the present invention is intended to distill non-potable water into potable drinking water through an innovative distillation unit 30 powered by solar energy. Referring to FIGS. 1-4, a distillation unit 30 having a heating chamber 32, a condensing portion 34, a pre-heat jacket 36, and a trough 38 is shown. The heating chamber 32 has a first end 40 and a second end 42 with a sidewall 44 extending therebetween defining an interior 46. The interior 46 of the heating chamber 32 is adapted to contain a volume of liquid, such as a non-potable liquid 48 therein. In one embodiment, the non-potable liquid 48 may be brine, salt water, or other liquid including a salinized component. The non-potable liquid 48 may be provided from an ocean or other natural body of water, or commercial or industrial waste stream. In a further embodiment, the non-potable liquid 48 may include a 3.5% brine, such as typical ocean water.

The second end 42 of the heating chamber 32 may have any suitable shape appropriate to contain a volume of liquid therein. In one configuration, shown in FIGS. 1-3, the second end 42 may include an enlarged portion 42A, such as a bulbous profile, having increased surface area for application of heat thereto. In another configuration, shown in FIG. 4, the second end 42 may include an enlarged portion 42B, having at least one dimension that is increased with respect to a corresponding dimension of the first end 40, having increased surface area for application of heat thereto. As will be discussed herein, the second end 42 of the heating chamber 32 is adapted to receive applied heat and to transfer the heat applied thereto to the non-potable liquid 48 contained within the interior 46 of the heating chamber 32. Accordingly, the second end 42 may include an enlarged portion 42A, 42B having a profile which increases the surface area of the second end 42 to provide increased distribution of heat there-across. In one embodiment, the heat applied to the second end 42 of the heating chamber 32 may be heat generated from concentrated solar energy, as will be described herein. In another configuration, the heat may be provided fully or partially from other conventional sources, such as natural gas, coal, or electricity. In a further configuration, the first end 40 of the heating chamber 32 may include a generally cylindrical section 40A having a reduced diameter as compared to the second end 42.

Referring again to FIGS. 1-4, a condensing portion 34 may be provided adjacent the heating chamber 32, such as adjacent the first end 40 of the heating chamber 32. In one embodiment, the condensing portion 34 has a generally dome-shaped profile having an apex 56. As used herein, the term "dome-shaped" includes any profile having a curvature and/or any profile defining an apex from a plurality of segmented sections. In one configuration, the condensing portion 34 includes an inner surface 50 and an outer surface 52, with the inner surface 50 disposed at least partially over the first end 40 of the heating chamber 32. In a further configuration, at least a portion of the first end 40 of the heating chamber 32 is disposed within or surrounded by a distal end 54 of the condensing portion 34.

Figure 3:
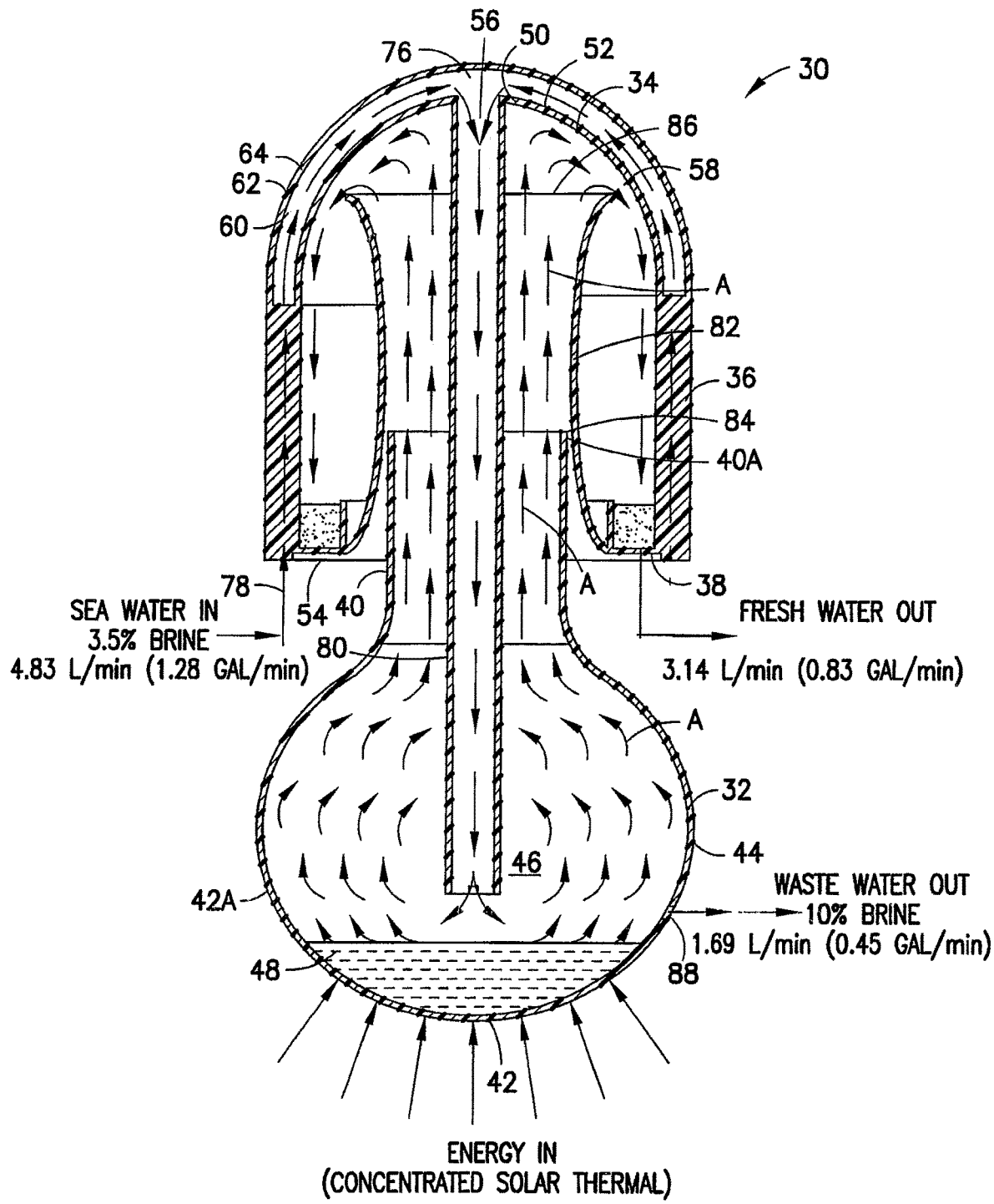
FIG. 3 is a partial schematic cross-sectional side view of the distillation unit of FIG. 1 taken along line C-C showing fluid movement within the system in accordance with an embodiment of the present invention.

The first end 40 of the heating chamber 32 and the inner surface 50 of the condensing portion 34 are provided in fluid-transfer communication. As used herein, the term "fluid-transfer communication" means that liquid contained within the heating chamber 32 may be expelled from the heating chamber 32 through the first end 40 to contact the inner surface 50 of the condensing portion 34. In one embodiment, the non-potable liquid 48 within the heating chamber 32 may be heated until at least a portion of the liquid vaporizes and contacts the inner surface 50 of the condensing portion 34 in the form of purified vapor or steam. Upon contact with the inner surface 50 of the condensing portion 34, the steam condenses and/or coalesces into potable water droplets. Referring specifically to FIG. 3, the flow of vapor from the second end 42 of the heating chamber 32 up through the first end 40 and out of the heating chamber 32 is shown. This vapor impinges on the inner surface 50 of the condensing portion 34 which is provided at a temperature below that of the steam. Accordingly, the vapor is cooled and condenses on the inner surface 50 of the condensing portion 34 in the form of potable liquid. The inner surface 50 of the condensing portion 34 may include a curvature 58 sufficient to direct the potable liquid along the inner surface 50 in a downward direction and into a trough 38 adapted to receive potable liquid therein.

In one embodiment, the trough 38 is provided adjacent the first end 40 of the heating chamber 32 such that potable liquid contacting the inner surface 50 of the condensing portion 34 may drip from the distal end 54 of the condensing portion 34 into the trough 38 to direct the potable liquid from the distillation unit 30 to a useable location, such as a spigot or collection container (not shown). In one embodiment, the trough 38 may be annularly disposed about the condensing portion 34 such as in the form of a substantially circular trough.

Referring once again to FIGS. 1-4, the distillation unit 30 also includes a pre-heat jacket 36 disposed at least partially adjacent the outer surface 52 of the condensing portion 34. The pre-heat jacket 36 may include a first surface 60 and a second surface 62 defining an interior 64 therebetween adapted to receive non-potable liquid therein. In one embodiment, the pre-heat jacket 36 may include a first surface 60 and a second surface 62 each in the form of a continuous curved sheet having substantially the same curvature and dimensioned to closely mimic the profile of the outer surface 52 of the condensing portion 34. In this configuration, the interior 64 may take the form of a continuous pocket adapted to contain non-potable liquid. Alternatively, the interior 64 may include a plurality of segmented pockets defined between the first surface 60 and the second surface 62. In accordance with another embodiment of the present invention, the pre-heat jacket 36 may include a plurality of linked hollow tubes 70, as shown in FIGS. 9-10, joined at a common apex 72 and surrounding perimeter 74. The linked tubes 70, common apex 72, and surrounding perimeter 74 may be provided in fluid communication therewith for receiving non-potable liquid therein. In this configuration, the linked tubes 70 each include a first surface 60A and a second surface 62A, taken collectively as the first surface 60 and the second surface 62 of the pre-heat jacket, respectively.

Referring again to FIGS. 1-4, the first surface 60 of the pre-heat jacket 36 may be disposed at least partially adjacent the outer surface 52 of the condensing portion 34. In one configuration, the first surface 60 of the pre-heat jacket 36 may be disposed immediately adjacent the outer surface 52 of the condensing portion 34, such that a portion of the condensing portion 34 extends within a portion of the pre-heat jacket 36. In use, excess heat transferred to the condensing portion 34 by the vapor may be transferred to the pre-heat jacket 36 to increase the temperature of the non-potable liquid contained within the interior 64 of the pre-heat jacket 36. As shown specifically in FIGS. 3-4, the pre-heat jacket 36 may include an access entry 56 for introducing non-potable liquid for distillation from the interior 64 of the pre-heat jacket 36 into the interior 46 of the heating chamber 32. In this configuration, the temperature of the non-potable liquid entering the heating chamber 32 is elevated and thus requires less applied heat to the heating chamber 32 to generate vapor as described above.

Figure 2:
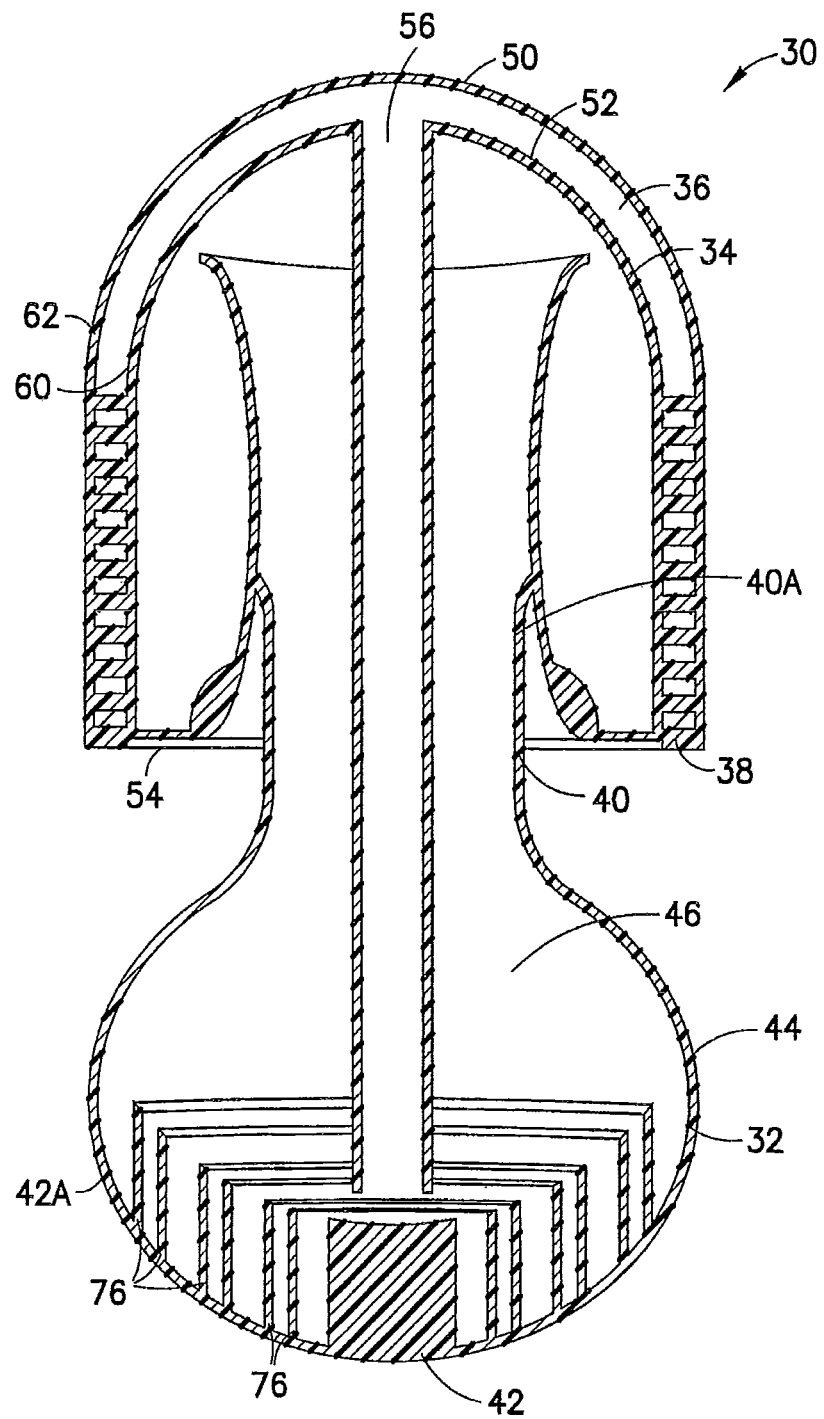
FIG. 2 is a schematic cross-sectional side view of the distillation unit of FIG. 1 taken along line C-C in accordance with an embodiment of the present invention.

In a further embodiment, as shown specifically in FIG. 2, in order to further increase the efficiency of the heat applied to the heating chamber 32, a plurality of heat fins 76 may be disposed within the interior 46 of the heating chamber 32 to improve heat retention.

Figure 4:
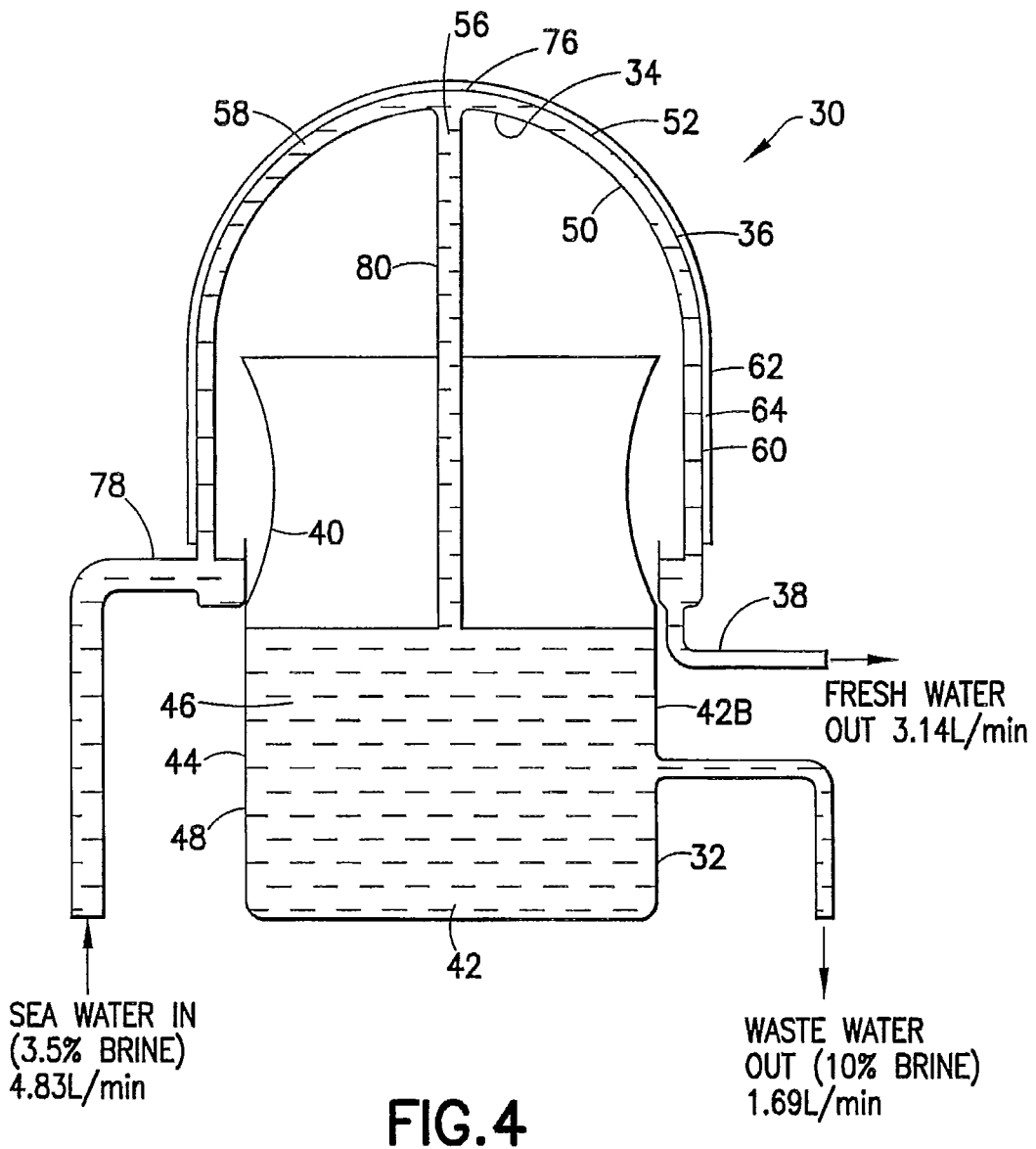
FIG. 4 is a partial schematic cross-sectional side view of a distillation unit in accordance with an embodiment of the present invention.

Referring to FIGS. 3-4, during use a non-potable liquid may be introduced to the distillation unit 30 through an entry 78 in the pre-heat jacket 36. The non-potable liquid may have an increased salinity, such as sea water having a 3.5% brine. The non-potable liquid may pass through the interior 64 of the pre-heat jacket 36 and through the access entry 56 into the interior 46 of the heating chamber 32. In one configuration, a substantially cylindrical tube 80 may be disposed between the access entry 56 and the interior 46 of the heating chamber 32 adjacent the second end 42 to direct the flow of non-potable liquid into the interior 46 of the heating chamber 32. Heat, such as from concentrated solar radiation, is applied to the second end 42 of the heating chamber 32 which is transferred to the non-potable liquid contained therein. The applied heat raises the temperature of the non-potable liquid to the point of boiling, resulting in a purified vapor component being released as potable water.

The purified vapor contacts the inner surface 50 of the condensing portion 34 which is provided at a temperature less than the temperature of the vapor, resulting in condensation of the purified vapor on the inner surface 50 of the condensing portion 34. In one embodiment, as shown specifically in FIG. 3, a vapor directional structure 82 may be provided for directing the purified vapor toward the condensing portion 34. The vapor directional structure 82 may include a first portion 84 in communication with the non-potable liquid and a second portion 86 adjacent the inner surface 50 of the condensing portion 34 for directing at least a portion of the purified vapor to the inner surface 50 of the condensing portion 34. The condensed purified vapor in the form of potable liquid is directed down the sidewall of the condensing portion 34 and is directed into an annular trough 38 provided adjacent an upper portion of the heating chamber 32 and adjacent a lower portion of the condensing portion 34. The potable liquid is directed through the trough 38 and expelled from the distillation unit 30 to a collection and/or usage location.

Excess heat from the condensing portion 34 may be transferred to the non-potable liquid contained within the pre-heat jacket 36 to increase the rate of condensation of the purified vapor on the inner surface 50 of the condensing portion 34. The excess heat transferred to the non-potable liquid within the pre-heat jacket 36 also raises the temperature of the non-potable liquid directed into the heating chamber 32 toward the boiling point, thereby reducing the amount of externally applied heat required to raise the temperature of the non-potable liquid to the boiling point.

Referring again to FIG. 3, as a result of the production of purified vapor, impurities and salt content from the non-potable liquid remain within the interior 46 of the heating chamber 32 in an increasing quantity. Accordingly, a waste outlet 88 may be provided in fluid communication with the interior 46 of the heating chamber 32 to flush an amount of non-potable liquid having increased impurities and/or salt content therefrom. In one embodiment, non-potable liquid having a 3.5% brine is introduced into the distillation unit 30 at a rate of 4.83 L/min (1.28 gal/min). After operation of the distillation unit 30, potable liquid may be expelled from the distillation unit 30 at a rate of 3.14 L/min (0.83 gal/min) and a non-potable liquid having increased impurities, such as a 10% brine, may be drawn from the waste outlet 88 at a rate of 1.69 L/min (0.45 gal/min).

Figure 5:
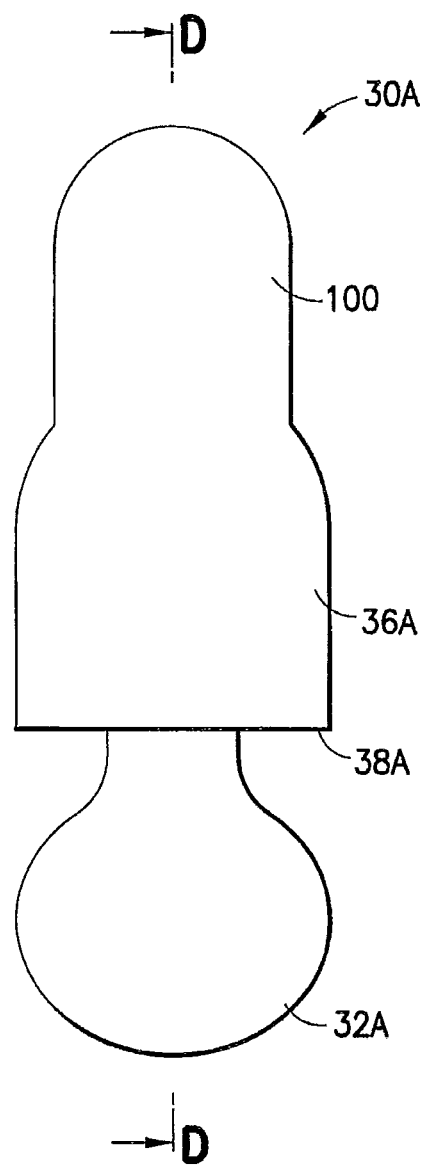
FIG. 5 is a schematic front view of a two-stage distillation unit in accordance with an embodiment of the present invention.
Figure 6:
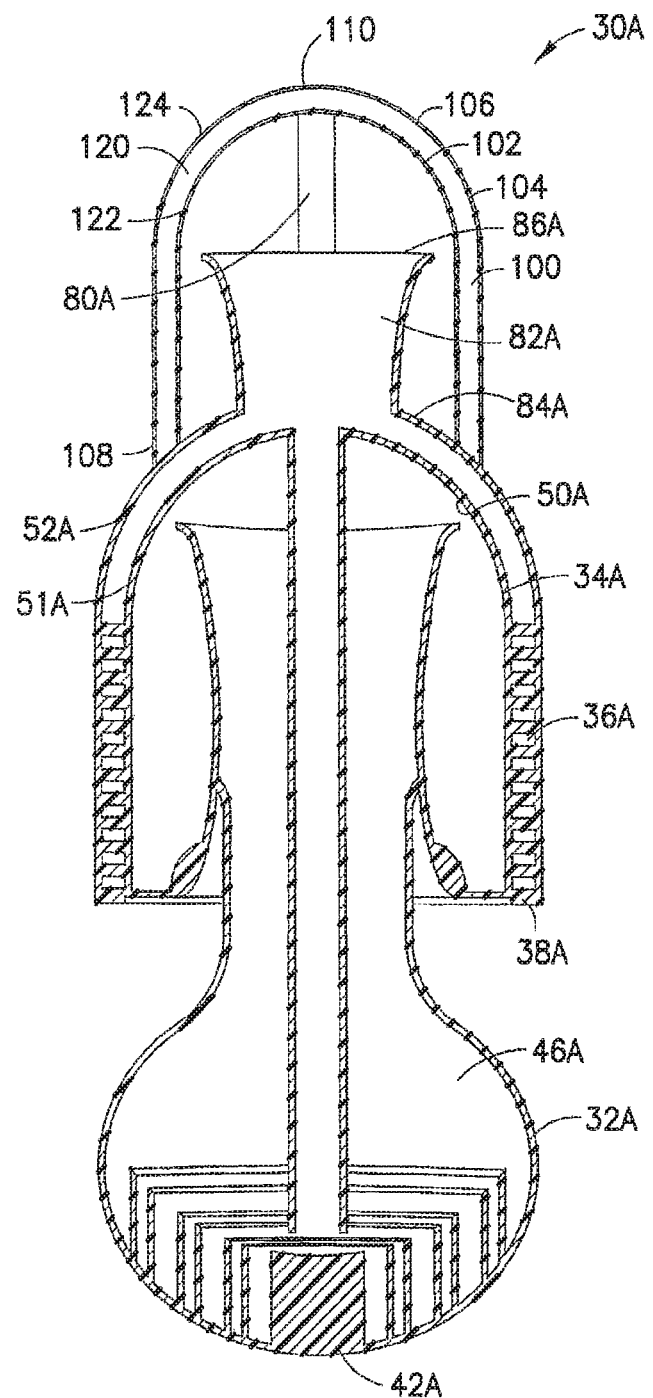
FIG. 6 is a schematic cross-sectional side view of the two-stage distillation unit of FIG. 5 taken along line D-D in accordance with an embodiment of the present invention.

Referring to FIGS. 5-6, a distillation unit 30A may include a structure substantially identical to the structure of the distillation unit 30 described above with reference to FIGS. 1-4, with the exception of a second pre-heat jacket 100 applied thereto. In this configuration, the distillation unit 30A includes a heating chamber 32A, a condensing portion 34A, a pre-heat jacket 36A, and a trough 38A, as similarly described above. The pre-heat jacket 36A includes a first surface 51A and a second surface 52A, as similarly described above. A second pre-heat jacket 100 includes a first surface 102 and a second surface 104 and an interior 106 defined therebetween adapted to receive a non-potable liquid for distillation therein, as similarly described with reference to the pre-heat jacket 36 of FIGS. 1-4. The second pre-heat jacket 100 may include an entry 108 for receiving non-potable liquid therein, and an access entry 110 for directing non-potable liquid into the interior 46A of the heating chamber 32A, as similarly described above. The first surface 102 of the second pre-heat jacket 100 may be disposed adjacent the second surface 52A of the pre-heat jacket 36A for the purpose of transferring excess heat from the pre-heat jacket 36A to the non-potable liquid contained within the second pre-heat jacket 100, thereby further increasing the efficiency of the distillation unit 30A.

In a further configuration, as shown in FIGS. 5-6, the distillation unit 30A may include a second condensing portion 120 having an inner surface 122 and an outer surface 124, with the second condensing portion 120 provided in fluid-transfer communication with the heating chamber 32A. The second pre-heat jacket 100 may be disposed adjacent the second condensing portion 120 such that the first surface 102 of the second pre-heat jacket 100 is provided adjacent the outer surface 124 of the second condensing portion 120 for transferring excess heat from the second condensing portion 120 to the non-potable liquid within the second pre-heat jacket 100, thereby further increasing the efficiency of the distillation unit 30A. It is noted herein, that a second substantially cylindrical tube 80A may be disposed between the access entry 110 and the interior 46A of the heating chamber 32A adjacent the second end 42A to direct the flow of non-potable liquid into the interior 46A of the heating chamber 32A, as similarly described above. It is also noted herein that a vapor directional structure 82A may be provided for directing the purified vapor toward the condensing portion 34A. The vapor directional structure 82A may include a first portion 84A in communication with the non-potable liquid and a second portion 86A adjacent the inner surface 50A of the condensing portion 34A for directing at least a portion of the purified vapor to the inner surface 50A of the condensing portion 34A.

Figure 7:
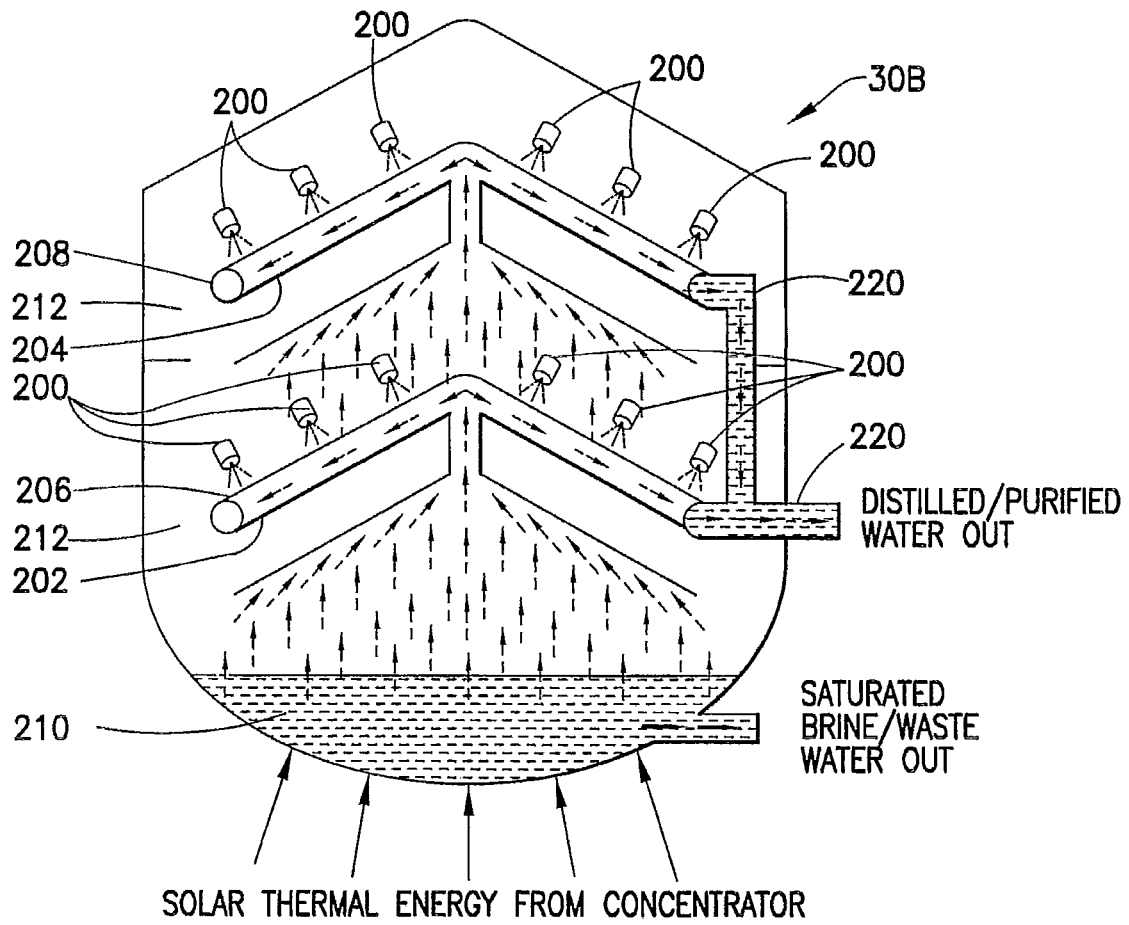
FIG. 7 is a schematic partial cross-sectional side view of a two-stage distillation unit in accordance with another embodiment of the present invention.
Figure 8:
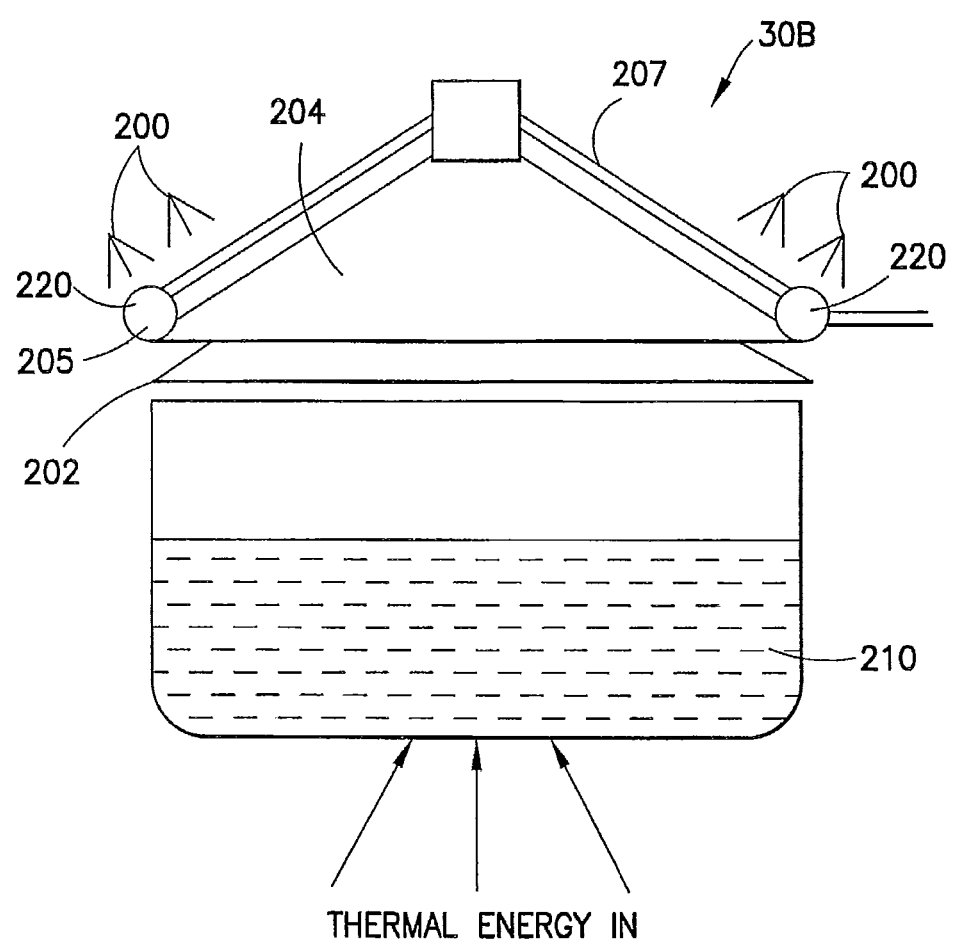
FIG. 8 is a schematic partial cross-sectional side view of a two-stage distillation unit in accordance with yet another embodiment of the present invention.
Figure 11:
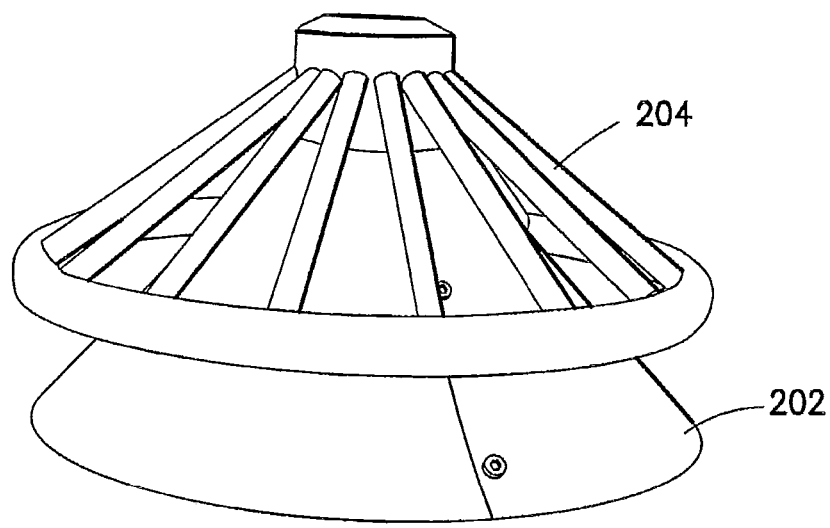
FIG. 11 is a photographic perspective representation of the pre-heat jacket of FIGS. 9-10 disposed over a condensing portion in accordance with an embodiment of the present invention.
Figure 13:
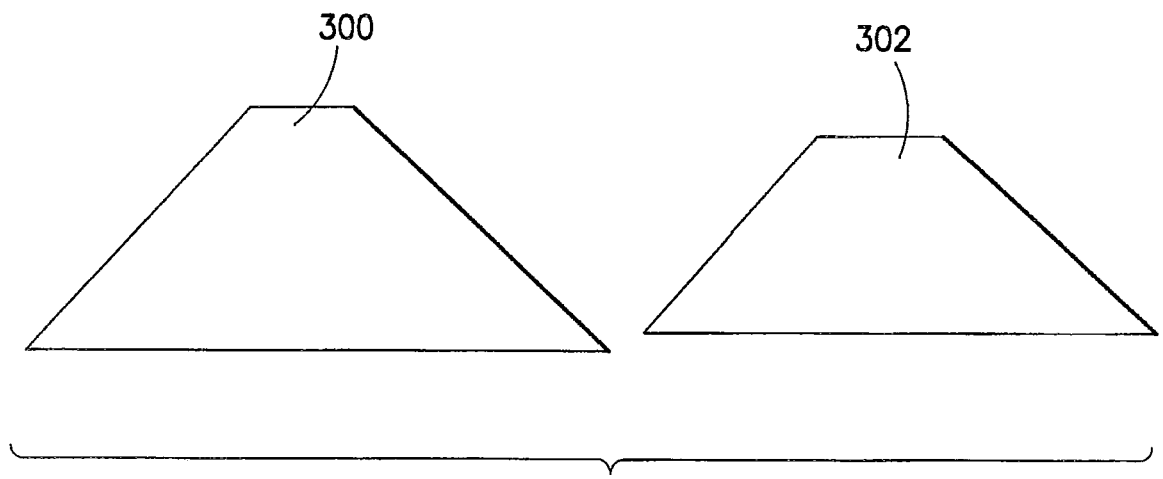
FIG. 13 is a photographic side view representation of a condensing portion and a second condensing portion of a distillation unit in accordance with an embodiment of the present invention.

Referring to FIGS. 7-8, in accordance with another embodiment of the present invention, a distillation unit 30B may include a plurality of liquid jets 200 adjacent the condensing portion 202 and/or the second condensing portion 204. In this configuration, non-potable liquid 48 is misted onto at least a portion of the condensing portion 202 and/or the second condensing portion 204. In one configuration, a pre-heat jacket and/or a second pre-heat jacket may include the liquid jets 200 to distribute mist onto the condensing portion 202 and/or the second condensing portion 204. The misted non-potable liquid is vaporized by the excess heat passed through a condensing portion 206 and/or a second condensing portion 208, as previously described herein. It is contemplated herein that excess non-potable liquid that is not vaporized, and/or includes increased impurities or saline content, is passed through drains 212 to a heating chamber 210. As the heating chamber 210 is heated, the non-potable liquid vaporizes producing a purified potable liquid which condenses on the condensing portion 202 and/or second condensing portion 204, with the non-potable liquid misting on the upper surfaces of the condensing portion 202 and second condensing portion 204 to increase the rate of condensation thereon. The potable liquid is directed to a trough 220 for expelling potable liquid from the distillation unit 30B.

Figure 12:
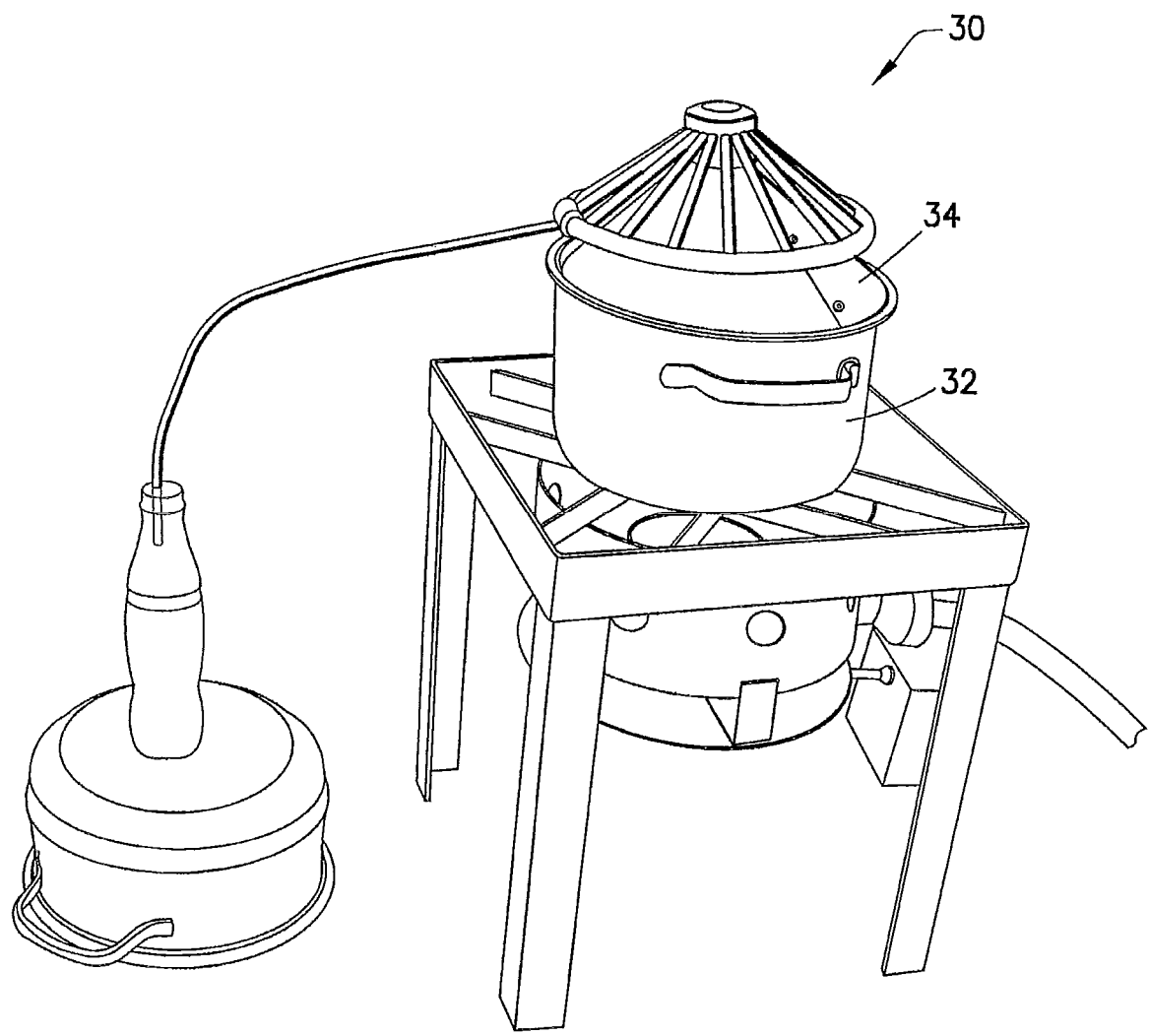
FIG. 12 is a photographic perspective representation of a distillation unit including the pre-heat jacket and condensing portion of FIG. 11 in accordance with an embodiment of the present invention.

Referring to FIGS. 9-16, representations of various components of a distillation unit 30, 30A, 30B are shown. Referring to FIG. 12, during procedural testing, a distillation unit 30 having a single condensing portion 34, i.e., "single stage" is shown. The distillation unit 30 was tested on a propane burner, at approximately 17,000 BTUs (5 kW), to simulate the energy that is obtained from the application of concentrated solar energy, such as by the use of a 10-foot (3-meter) parabolic solar concentrator. An initial test was performed with a 5% salt water solution (4.375-lbs of water and 0.22-lbs of salt by weight) as a non-potable liquid introduced into the distillation unit 30. The non-potable liquid is contained in a boiling chamber 32 with the single stage internal unit mounted above it. Non-potable liquid is misted on the condensing portion 34 through the pre-heat jacket 36 with the system diagram above.

For the single stage distillation unit 30, the system operates by the application of heat energy to the heating chamber 32, causing the non-potable liquid therein to boil. The purified vapor or steam rises into the condensing portion 34, or lower cone, leaving the contaminants behind in the heating chamber 32. As shown in FIG. 8, incoming non-potable contaminated water is misted or sprayed on the lower ring 205 and down-corners 207. In certain configurations, the second condensing portion 204 or upper cone protects the condensing portion 202 or lower cone from the spray, keeping the steam vapor in the lower cone from condensing before it reaches the cap. Once the steam vapor enters the cap, it follows the path of least resistance, and flows into the down-corners. The water misted onto the down-corners 207 and the lower ring 205 removes the heat from the steam vapor contained within the tubes, causing it to condense. The resultant product is distilled potable water. This same process is repeated for multiple stages, recovering the excess energy from stage to stage. As shown in FIGS. 13-16, a condensing portion 300 and a second condensing portion 302 may be combined with a pre-heat jacket 304 and a second pre-heat jacket 306, to produce a multi-stage system shown in FIG. 16 and described in detail above.

As shown below in Table 1, the possible amount of distilled water production, from an analytical standpoint, from a multi-staged unit is presented. For the initial design, a heat/energy pass-through of 86% was assumed. For comparison reasons, Table 1 shows the theoretical amount of water that can be distilled from a single stage unit to a 15-stage unit for an 86% and 96% heat capture. For a 10% increase in heat recapture (86% to 96%) on a multi-stage unit, there is an approximate 55% increase in the amount of distilled water that is capable of being produced.

TABLE 1

Theoretical amount of distilled water that can be produced by a solar thermal distillation unit. This table is calculated for use of a 10-ft (3-m) diameter concentrator with an approximate reflectivity of 92%.
Theoretical Distilled Water Production in Gallons per Day*

| # Of | Energy Input: 5-kW Heat Pass-Through | | Energy Input: 4.2-kW Heat Pass-Through | |
|---|---|---|---|---|
| Stages | 86% | 96% | 86% | 96% |
| 1 | 16.9 | 16.9 | 14.35 | 14.35 |
| 2 | 31.4 | 33.13 | 26.68 | 28.12 |
| 3 | 43.9 | 48.7 | 37.29 | 41.34 |
| 4 | 54.7 | 63.6 | 46.42 | 54.03 |
| 5 | 63.9 | 78.03 | 59.26 | 66.2 |
| 6 | 71.89 | 91.81 | 61.02 | 77.91 |
| 7 | 78.7 | 108.04 | 66.82 | 89.14 |
| 8 | 84.6 | 117.7 | 71.81 | 99.92 |
| 9 | 89.7 | 129.94 | 76.1 | 110.27 |
| 10 | 94 | 141.6 | 79.8 | 120 |
| 11 | 97.8 | 152.8 | 82.97 | 129.75 |
| 12 | 100.98 | 163.67 | 95.7 | 138.9 |
| 13 | 103.79 | 179.03 | 99.05 | 147.69 |
| 14 | 106.13 | 183.97 | 90.07 | 156.13 |
| 15 | 108.18 | 193.97 | 91.8 | 164.23 |

*Day = 8-hrs at Peak Energy Input

The initial tests were performed with the stage internals being open to ambient conditions, thus losing a large amount of heat to the surroundings. These initial tests resulted in an average output of 2-oz. per minute. The theoretical value, for a well-insulated system, with very little heat loss, is approximately 3.83-oz. per minute. With a well-insulated housing around the stage, the output of a distillation unit should easily come within 10% of the projected output. As was mentioned previously, the influent water for these initial tests was a 5% salt water solution by weight. The effluent water from the single stage test was of the purest form. There was no visible by-product, discoloration, odor, or taste in the effluent catch container.

Figure 17:
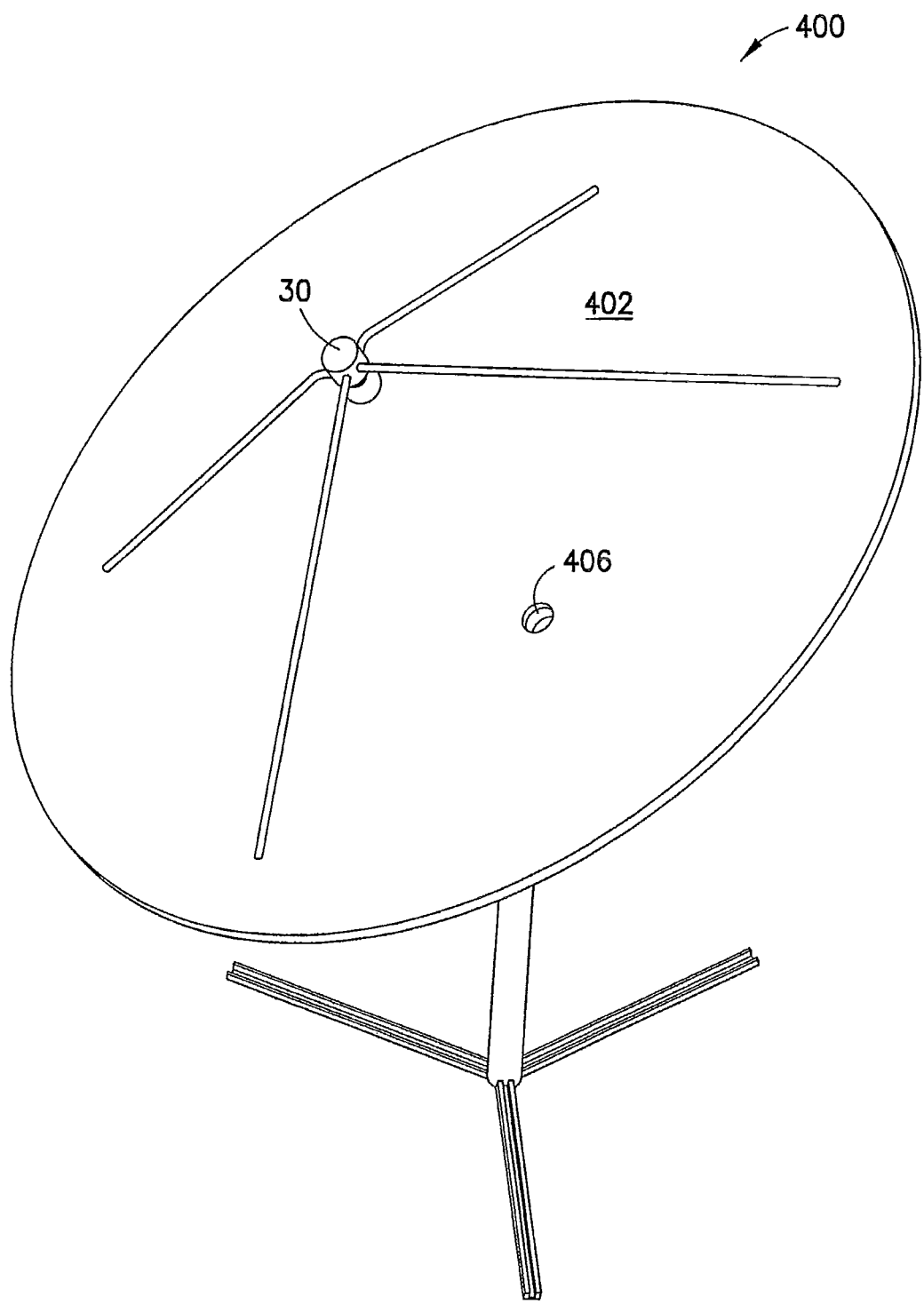
FIG. 17 is a photographic perspective representation of a distillation system in accordance with an embodiment of the present invention.
Figure 18:
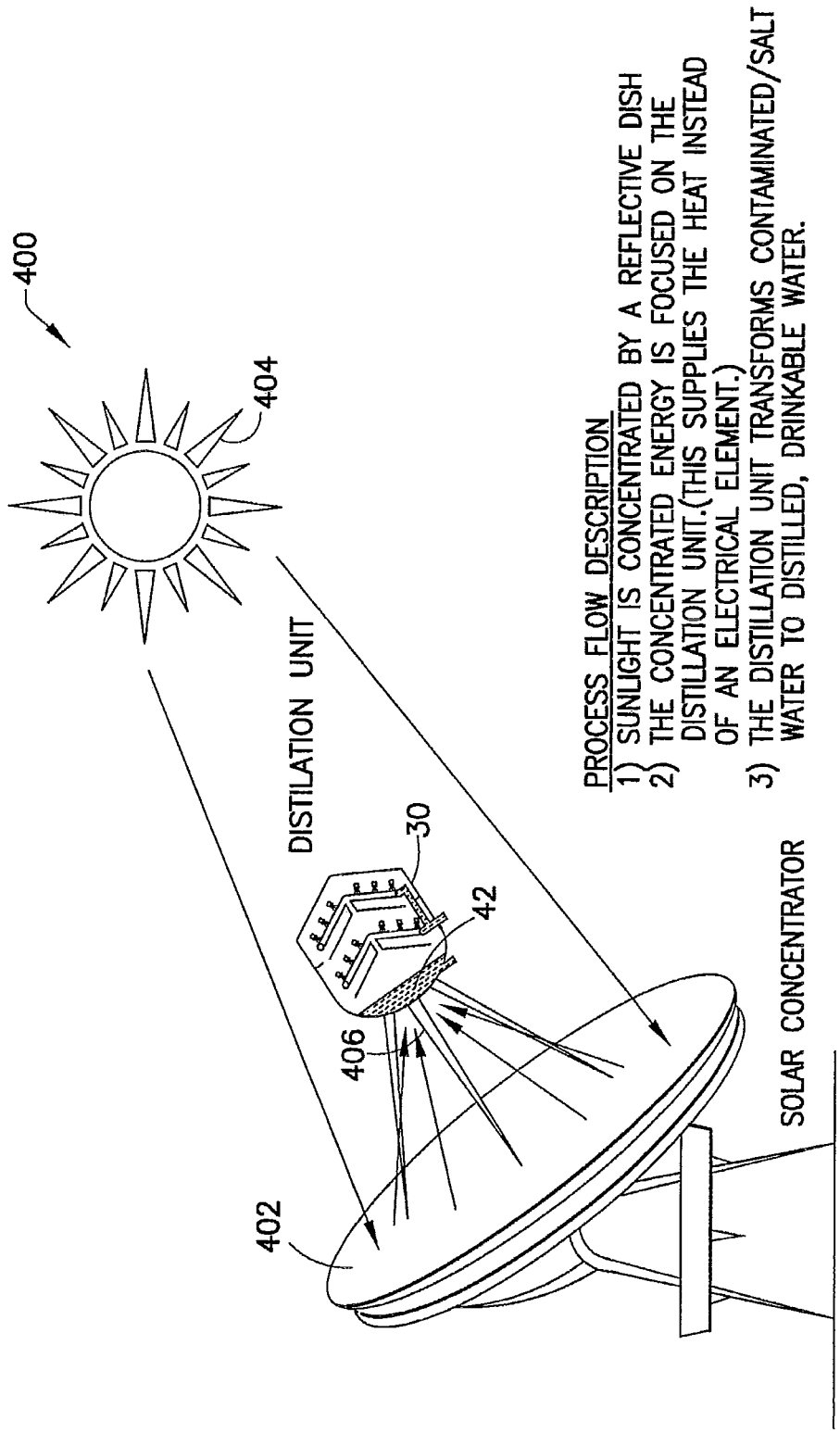
FIG. 18 is a schematic representation of a distillation system in accordance with an embodiment of the present invention.

Referring now to FIGS. 17-19, a distillation system 400 is shown including a distillation unit 30, 30A, 30B, as described above. With reference to FIGS. 17-18, a concentrator 402 is adapted to receive and concentrate solar radiation from the sun 404 and capture heat therefrom. In one embodiment, the concentrator 402 is a reflective dish having a mirrored or other reflective surface oriented to concentrate radiation impinging thereon to a focal point 406. As shown in FIGS. 17-18, the distillation unit 30 may be positioned at the focal point 406, such that the second end 42 of the heating chamber 32 is adapted to receive the heat from the concentrated solar radiation focused at the focal point 406.

Referring to FIGS. 20A-20F, in certain embodiments, the concentrator 402 may include a plurality of individual dish segments 500 which may be joined to form a concentrator 402. In this embodiment, the segments 500 may have any shape, such that when the segments 500 are joined, a concentrator 402 capable of focusing solar radiation is formed. In certain embodiments, the concentrator 402 may be substantially circular having a convex curvature. It is noted that any number of segments 500 may be joined to form the fully formed concentrator 402. In certain embodiments, the number of segments 500 may correspond generally with the overall diameter of the concentrator 402. For example, a concentrator 402 having an overall diameter of about 2.4 meters may have six segments 500 which are engageable to form the concentrator 402.

Figure 20:
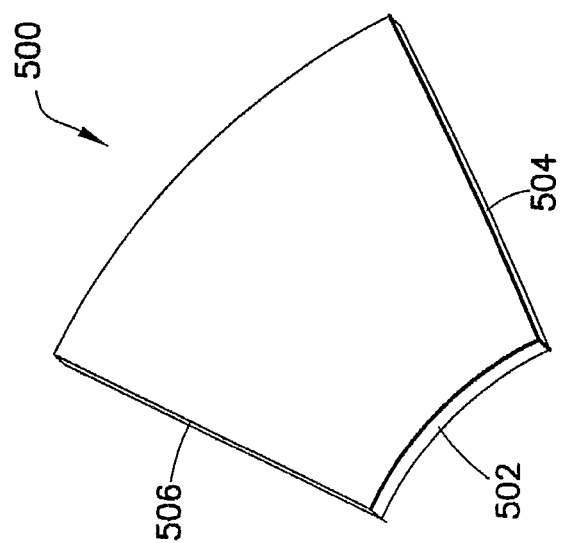
FIG. 20 is a perspective front view of a fully formed segment in accordance with another embodiment of the present invention.
Figure 20A:
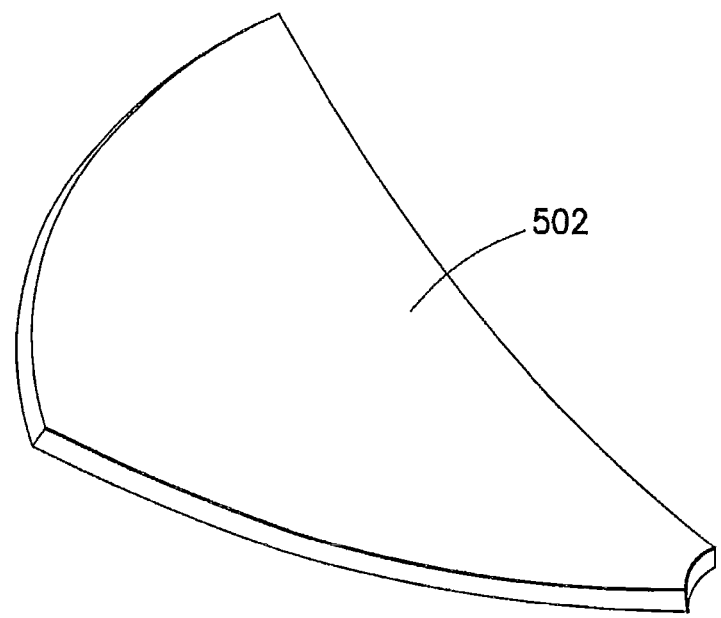
FIG. 20A is a perspective view of a supportive dish segment in accordance with an embodiment of the present invention.

Referring to FIG. 20A, the individual dish segments may include a supportive dish section 502 formed of a generally rigid material, such as a generally rigid metal, polymeric composition, or combinations thereof. In one embodiment, the dish segments 502 may be formed of thin walled steel, fiberglass, polymeric or metal mesh, and the like. Each dish segment 502 may have a generally convex arcuate shape, as shown in FIG. 20A.

Figure 20B:
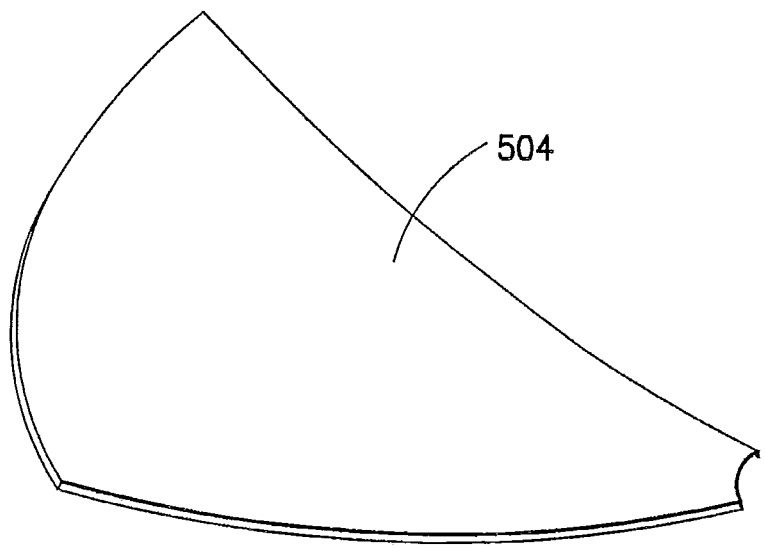
FIG. 20B is a perspective view of a reflective surface segment in accordance with an embodiment of the present invention.

Referring now to FIG. 20B, the supportive dish segments 502 may be provided to support a corresponding reflective surface segment 504. The reflective surface segment 504 may be formed by any suitable reflective surface formation process and may be formed of or coated with any suitably reflective material. Typically, the reflective surface segment 504 may be provided in thin sheet over the supportive dish segment 502. In one embodiment, the reflective surface segment 504 may be formed by a thermoforming process in which a polymeric material, such as polyacrylic, may be formed to the shape and curvature of the supportive dish segment 502 and back-coated by aluminized vapor deposition to impart a reflective surface to the reflective surface segment 504. In other embodiments, the reflective surface segment 504 may be formed by front-coating the segment and subsequently providing a protective transparent coating thereover. In other configurations, other coatings and deposition techniques may be used, such as sputtering over a metallic substrate. Alternatively, the reflective surface segment 504 may be provided as one of multiple layers, such as one of multiple laminated layers. In certain configurations, the reflective surface segment 504 may be one of multiple laminated layers in a laminated plastic film. In still other embodiments, the reflective surface segment 504 may be provided by spraying, rolling, or dipping the reflective coating onto a supporting substrate. In still other embodiments, silver, or other metallic and/or reflective components may be used to form the reflective surface segment 504.

In certain configurations of the present invention, the reflective surface segment 504 may be first formed and subsequently coated. In other configurations of the present invention, the reflective surface segment 504 may be formed of a pre-formed reflective material and subsequently formed into a desired shape. In one embodiment, the reflective surface segment 504 may be formed of a reflective coated film and subsequently formed into the desired shape.

Figure 20C:
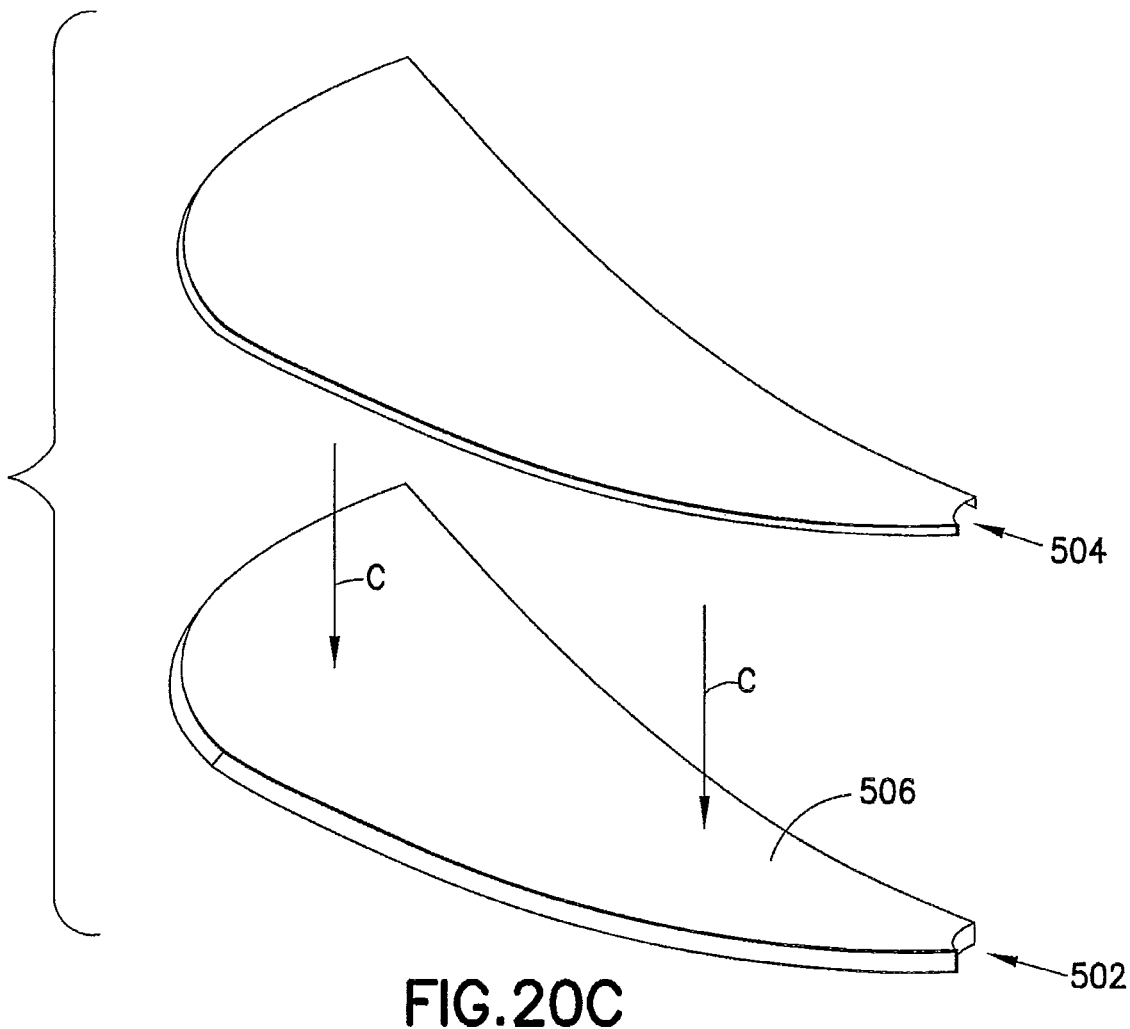
FIG. 20C is a perspective view of the combination of the supportive dish segment of FIG. 20A with the reflective surface segment of FIG. 20B in accordance with an embodiment of the present invention.

The reflective surface segment 504 may be adhered to the upper surface 506 of the supportive dish segment 502, as shown by the arrows C in FIG. 20C. In one embodiment, the reflective surface segment 504 may be adhered to the upper surface 506 of the supportive dish segment 502 by adhesive means, such as glues and/or epoxies, or mechanical fastening means, such as rivets, bolts, or other interlocking mechanical fastening systems.

In yet another configuration, the reflective surface segment 504 and the supportive dish segment 502 may be co-formed or provided from a single structure to provide a segment 500. In this embodiment, the segment 500 may be engaged directly with other segments 500 to form the concentrator 402. Alternatively, the segment 500 may be engaged with other segments 500 by providing the segments 500 onto or otherwise engaged with a skeleton frame structure. The skeleton frame structure may include a plurality of open frame elements adapted to allow the segments 500 to be placed directly onto or within in order to form a concentrator 402.

Figure 20D:
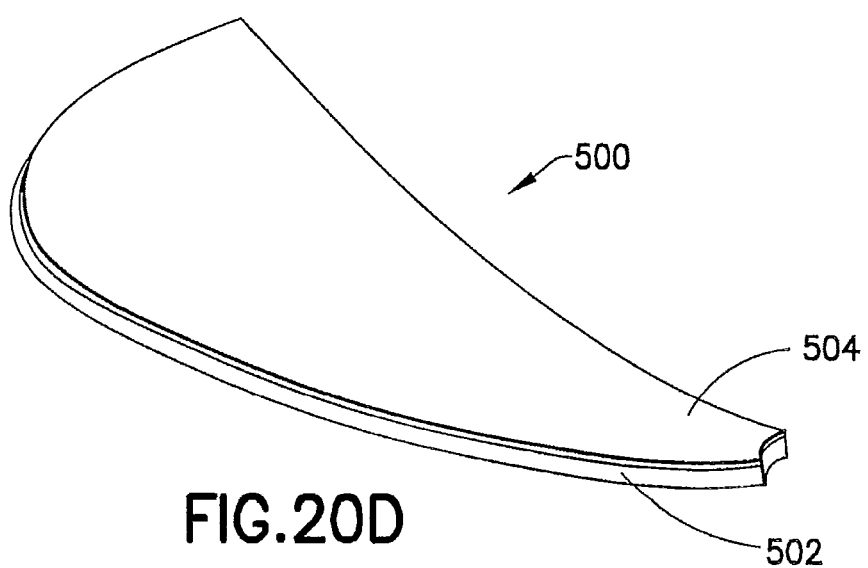
FIG. 20D is a perspective view of the supportive dish segment and reflective surface segment of FIG. 20C as a fully formed segment in accordance with an embodiment of the present invention.
Figure 20F:
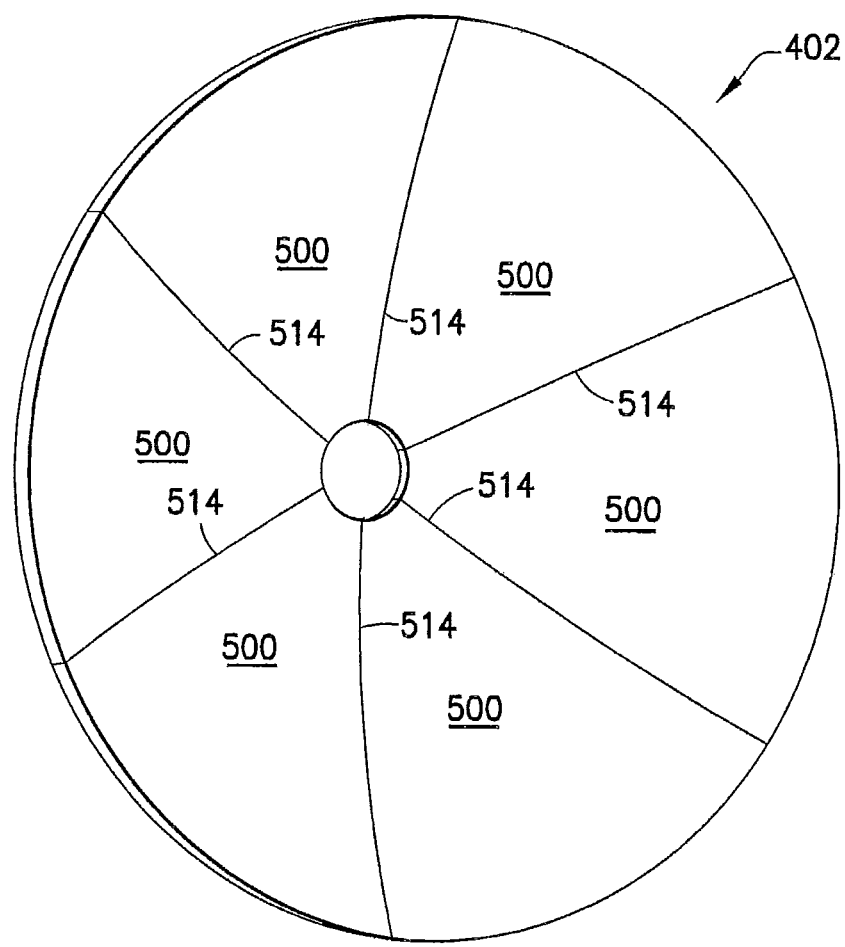
FIG. 20F is a perspective view of a collector formed of a plurality of interlocking segments in accordance with an embodiment of the present invention.

Referring to FIG. 20D, the segment 500 formed of a combined reflective surface segment 504 and a supportive dish segment 502 may be combined with other segments 500, as shown in FIG. 20E, to form a concentrator 402, as shown in FIG. 20F. As shown in FIG. 20E, a first segment 500a may include a first engaging structure 510 and a second segment 500b may include a second engaging structure 512 adapted to engage the first engaging structure 510. The first engaging structure 510 may include a recess or other cavity, and the second engaging structure 512 may include a protrusion or other raised surface for correspondingly engaging the first engaging structure 510 to secure the segments 500a, 500b together. In another embodiment, the first engaging structure 510 and the second engaging structure 512 may include any suitable fastening system, such as slide locks, press-fit engagements, and the like. In yet another embodiment, the first engaging structure 510 and the second engaging structure 512 are positioned such that the convex curvature of the segment 500a corresponds to the convex curvature of the segment 500b to form a continuous and substantially uninterrupted curvature spanning both segments 500a, 500b. In yet another embodiment, the segments 500a, 500b are adapted such that when the segments 500a, 500b are joined, the seam 514 between the segments 500a, 500b is optically minimized such that the amount of radiation reflected from the upper surfaces 506a, 506b is maximized.

In one embodiment, a concentrator 402 formed of segments 500 may be appreciably easier to maintain in that a damaged segment may be easily removed and replaced without necessitating replacement of the entire concentrator 402. This configuration may be particularly well suited for use in harsh environments in which sand and/or other wind blown debris may scratch or otherwise damage the reflective surface of a collector 402. The labor and material costs associated with the replacement of a segment 500 may be significantly less than the labor and material costs associated with the replacement of an entire collector 402.

Referring to FIG. 19, in accordance with yet another embodiment of the present invention, a distillation system 400 includes a distillation unit 30, 30A, 30B, as described above. A concentrator 402 is adapted to receive and concentrate solar radiation from the sun 404 and capture heat therefrom. In one embodiment, the concentrator 402 is a reflective dish having a mirrored or other reflective surface oriented to concentrate radiation impinging thereon to a focal point 406. In this configuration, the distillation unit 30 may be positioned remote from the focal point 406, and a thermal receiver 408 may be positioned at the focal point 406 such that the thermal receiver 408 is adapted to receive the heat from the concentrated solar radiation focused at the focal point 406. The thermal receiver 408 may pass energy to a thermal storage unit 410, such as a molten salt thermal storage tank, for retaining heat therein. Heat from the thermal storage unit 410 is directed to the distillation unit 30, such as is directed to the heating chamber of the distillation unit as described above, and non-potable liquid 416 is introduced therein, as also described above. In a further embodiment, the thermal receiver 408 and thermal storage unit 410 form a collective thermal transfer system 414 adapted to capture, store, and transfer heat generated from concentrated solar energy to power the distillation unit 30 of the present invention.

Figure 21:
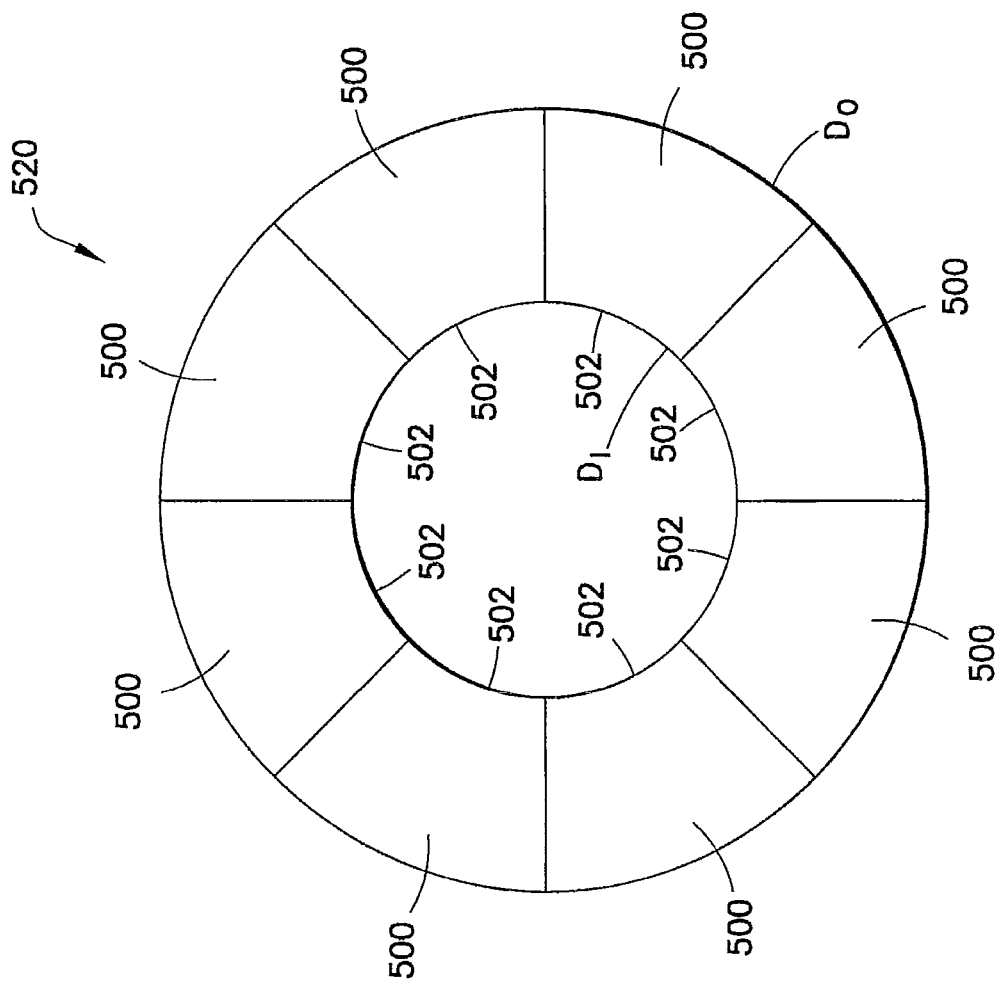
FIG. 21 is a perspective rear view of a collector formed of a plurality of fully formed segments of FIG. 20 in accordance with an embodiment of the present invention.
Figure 22:
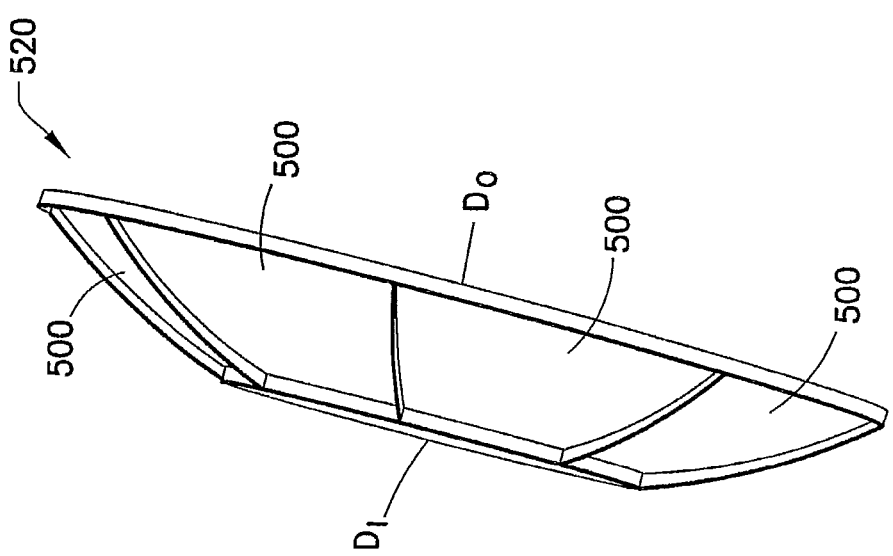
FIG. 22 is a perspective side view of the collector of FIG. 21 in accordance with an embodiment of the present invention.

Referring to FIGS. 20-23, in accordance with another embodiment of the present invention, the concentrator adapted to receive and concentrate solar radiation from the sun may be formed of a collector 520 having a plurality of segments 500 having a truncated inner profile 502. In this embodiment, each segment 500 includes first and second contacting surfaces 504, 506 for adjoining with a second segment 500. In one configuration, the first contacting surface 504 of a first segment 500 abuts a second contacting surface 506 of a second segment 500 to form a substantially circular ring structure such as a doughnut configuration, as shown in FIG. 21, having a center hole structure defined therein by the truncated inner profile 502 of each segment 500. As shown in FIG. 22, the collector 520 may have a substantially curved profile, as described above. Referring again to FIGS. 21-22, the collector 520 may have an outer diameter $D_O$ that is greater than an inner diameter $D_I$ along the center hole structure. In one embodiment, the ratio of $D_O:D_I$ is adapted to allow for a segment 500 to have no dimension greater than 48 inches. In another embodiment, the ratio of $D_O:D_I$ is adapted to allow for a segment 500 to have no dimension greater than 30 inches. Accordingly, the ratio of $D_O:D_I$ may be adapted to maximize ease of fabrication such that a collector 520 of any outer diameter $D_O$ can be formed while maintaining an easily fabricated segment 500, such as a segment 500 having no dimension greater than 48 inches.

Figure 23:
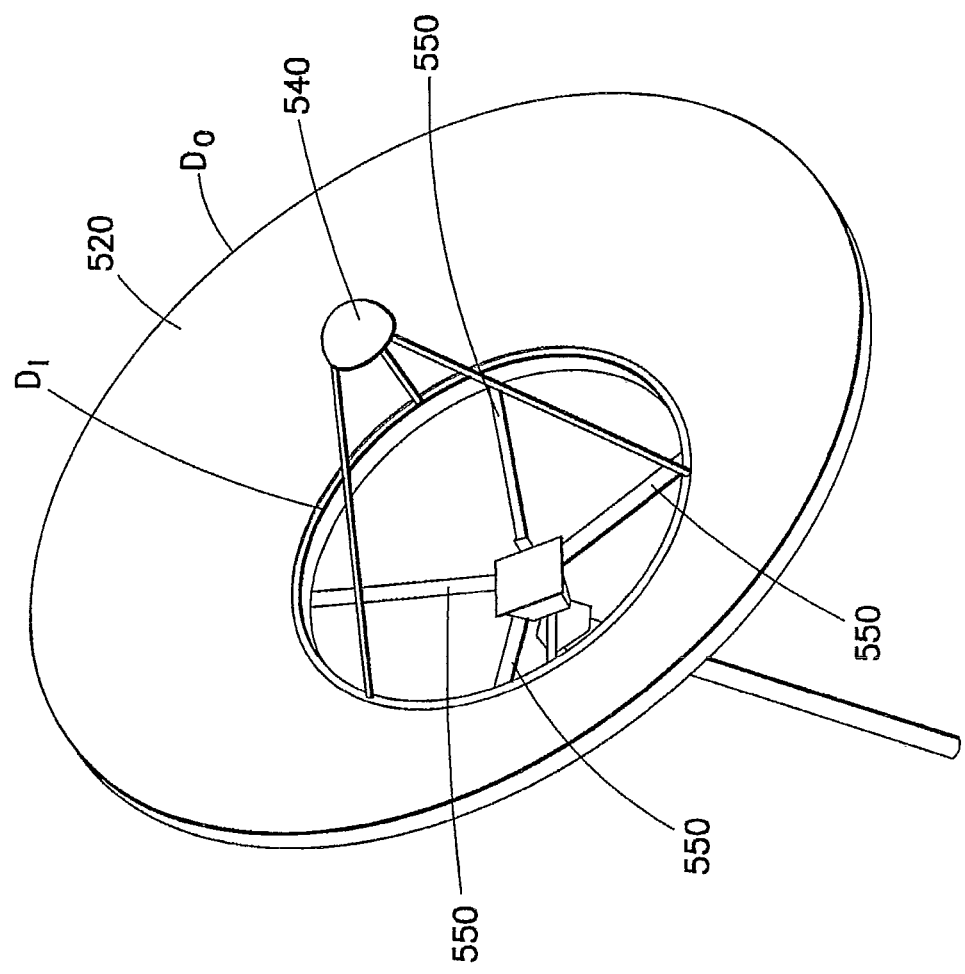
FIG. 23 is perspective front view of an assembled collector of FIGS. 21-22 and distillation unit in accordance with an embodiment of the present invention.

As shown in FIG. 23, the collector 520 may be provided with a distillation unit 540, as described herein. In one configuration, the distillation unit 540 may be mounted to the collector 520 at or adjacent the focal point of the collector by a mounting bracket 550 or plurality of mounting brackets 550. In this particular configuration, the focal point of the collector 520 may coincide with the center hole structure such that the focal point is located at an area that is not defined by a reflective surface of a segment 500. The collector 520 of this particular embodiment may have several advantages including reduced manufacturing costs. As the collector 520 of the present invention may be intended for positioning outdoors, the center hole structure of the collector 520 may also allow wind to pass therethrough, reducing the susceptibility of the collector 520 to be carried by wind currents. In another configuration, it is intended herein that the center hole structure of the collector 520 may be adapted with a device for harnessing wind power directed through the center hole structure. In another configuration, the mounting of the distillation unit 540 adjacent the focal point of the collector 520 may provide increased stability and durability.

What is claimed is:
1. A distillation unit, comprising:
a heating chamber having an open first end, a closed second end, and a sidewall extending therebetween defining an interior adapted to contain a non-potable liquid for distillation;
a dome-shaped condensing portion having an inner surface and an outer surface, the condensing portion disposed over the first end of the heating chamber, wherein the first end of the heating chamber and the inner surface of the condensing portion are provided in fluid-transfer communication;

a pre-heat jacket disposed about the condensing portion, the pre-heat jacket having a first surface and a second surface and an interior defined therebetween adapted to receive non-potable liquid, the first surface disposed adjacent the outer surface of the condensing portion, the pre-heat jacket defining an access entry corresponding to an apex of the condensing portion and a tube extending between the access entry and the heating chamber for introducing non-potable liquid for distillation into the interior of the heating chamber, wherein the non-potable liquid flows from the interior of the pre-heat jacket through the tube and into the heating chamber and vapor flows from the heating chamber in the opposite direction on an outside of the tube; and a trough positioned between the second end of the heating chamber and the dome-shaped condensing portion adjacent the first end of the heating chamber for receiving a potable liquid therein.

2. The distillation unit of claim 1, wherein at least a portion of the heating chamber is adapted to receive heat from concentrated solar energy.

3. The distillation unit of claim 2, wherein at least a portion of the heating chamber is adapted to transfer heat received from concentrated solar energy to the non-potable liquid contained therein, and wherein the heating chamber vaporizes at least a portion of the non-potable liquid to form a purified vapor.

4. The distillation unit of claim 3, wherein the inner surface of the condensing portion is adapted to receive the purified vapor thereon and to condense the purified vapor into the potable liquid.

5. The distillation unit of claim 4, wherein the potable liquid is directed into the trough for expelling the potable liquid from the distillation unit.

6. The distillation unit of claim 4, wherein the non-potable liquid disposed within the interior of the pre-heat jacket has a temperature that is lower than the temperature of the outer surface of the condensing portion.

7. The distillation unit of claim 1, further comprising a vapor directional structure positioned within the condensing portion for directing at least a portion of the purified vapor to the inner surface of the condensing portion.

8. The distillation unit of claim 1, wherein the heating chamber further comprises a waste outlet for expelling a portion of the non-potable liquid therefrom.

9. The distillation unit of claim 1, wherein the pre-heat jacket further comprises an inlet in fluid communication with a source of non-potable liquid.

10. The distillation unit of claim 1, wherein the first surface of the pre-heat jacket is adapted to receive excess heat from the outer surface of the condensing portion and to transfer the excess heat to the non-potable liquid disposed within the interior of the pre-heat jacket.

11. The distillation unit of claim 10, wherein the transfer of excess heat to the non-potable liquid disposed within the interior of the pre-heat jacket increases the rate of condensation of the purified vapor on the inside surface of the condensing portion.

12. The distillation unit of claim 10, wherein the non-potable liquid disposed within the pre-heat jacket is directed through the access entry as the non-potable liquid approaches the boiling point.

13. The distillation unit of claim 1, further comprising a second pre-heat jacket having a first surface and a second surface and an interior defined therebetween adapted to receive a non-potable liquid for distillation therein, the first surface of the second pre-heat jacket disposed adjacent the second surface of the pre-heat jacket.

14. The distillation unit of claim 13, wherein the second pre-heat jacket defines a second access entry for introducing non-potable liquid for distillation into the interior of the heating chamber.

15. The distillation unit of claim 13, wherein the second pre-heat jacket is adapted to capture excess heat from the pre-heat jacket and to transfer the excess heat to the non-potable liquid disposed within the interior of the second pre-heat jacket.

16. The distillation unit of claim 1, wherein the second end of the heating chamber includes an enlarged portion and the first end of the heating chamber includes a generally cylindrical section having a reduced diameter as compared to a diameter of the enlarged portion.

17. A distillation system, comprising:
a parabolic dish concentrator adapted to receive and concentrate solar radiation from the sun and capture heat therefrom; and
a separate distillation unit according to claim 1 positioned at or remote from the focal point of the concentrator.

18. The distillation system of claim 17, wherein the concentrator is formed of a plurality of segments.

19. The distillation system of claim 18, wherein the concentrator is formed of a plurality of interlocking segments.

20. The distillation system of claim 17, wherein the concentrator has a circular outer perimeter.

21. The distillation system of claim 20, wherein the focal point of the concentrator is coincident with the center of the perimeter.

22. The distillation system of claim 17, further comprising a thermal receiver adapted for receiving solar radiation from the sun and converting the solar radiation into heat at least partially positioned at a focal point of the concentrator and separate from the concentrator;
a thermal storage reservoir separate from the heating chamber;
a heating circuit extending between the thermal receiver and the thermal storage reservoir, wherein a heat transfer medium circulated through the heating circuit is heated by the solar radiation received by the thermal receiver and heat from the heated heat transfer medium is stored in the thermal storage reservoir; and
a heat transfer circuit extending between the thermal storage reservoir and the heating chamber, whereby stored heat from the thermal storage reservoir is transferred to the non-potable liquid contained in the heating chamber.

23. The distillation system of claim 17, wherein the concentrator comprises a supportive dish segment and a reflective surface segment.

24. The distillation system of claim 23, wherein the reflective surface segment is back-coated by aluminized vapor deposition.

25. A distillation unit, comprising:
a heating chamber having an open first end, a closed second end, and a sidewall extending therebetween defining an interior adapted to contain a non-potable liquid for distillation;
a dome-shaped condensing portion having an inner surface and an outer surface, the condensing portion disposed over the first end of the heating chamber, wherein the first end of the heating chamber and the inner surface of the condensing portion are provided in fluid-transfer communication;

a first pre-heat jacket disposed about the condensing portion, the first pre-heat jacket having a first surface and a second surface and an interior defined therebetween adapted to receive non-potable liquid, the first surface disposed adjacent the outer surface of the condensing portion, the first pre-heat jacket defining an access entry corresponding to an apex of the condensing portion and a tube extending between the access entry and the heating chamber for introducing non-potable liquid for distillation into the interior of the heating chamber, wherein the non-potable liquid flows from the interior of the pre-heat jacket through the tube and into the heating chamber and vapor flows from the heating chamber in the opposite direction on an outside of the tube;

a second pre-heat jacket disposed about the second condensing portion, the second pre-heat jacket having a first surface and a second surface and an interior defined therebetween adapted to receive non-potable liquid, the first surface of the second pre-heat jacket disposed adjacent the second surface of the first pre-heat jacket or adjacent an outer surface of a second condensing portion, the second pre-heat jacket defining an access entry for introducing non-potable liquid for distillation into the interior of the heating chamber; and a trough positioned between the second end of the heating chamber and the dome-shaped condensing portion adjacent the first end of the heating chamber for receiving a potable liquid therein.

26. The distillation unit of claim 25, wherein the second pre-heat jacket is adapted to receive excess heat from the pre-heat jacket and to transfer the excess heat to the non-potable liquid disposed within the second pre-heat jacket.

27. The distillation unit of claim 25, wherein the second end of the heating chamber includes an enlarged portion and the first end of the heating chamber includes a generally cylindrical section having a reduced diameter as compared to a diameter of the enlarged portion.

28. A distillation system, comprising:
a parabolic dish concentrator adapted to receive and concentrate solar radiation from the sun and capture heat therefrom; and
a separate distillation unit according to claim 25 positioned at or remote from the focal point of the concentrator.

29. The distillation system of claim 28, wherein the concentrator is formed of a plurality of segments.

30. The distillation system of claim 29, wherein the concentrator is formed of a plurality of interlocking segments.

31. The distillation system of claim 28, wherein the concentrator has a circular outer perimeter.

32. The distillation system of claim 31, wherein the focal point of the concentrator is coincident with the center of the perimeter.

33. The distillation system of claim 28, wherein the concentrator comprises a supportive dish segment and a reflective surface segment.

34. The distillation system of claim 33, wherein the reflective surface segment is back-coated by aluminized vapor deposition.

35. The distillation system of claim 28, further comprising a thermal receiver adapted for receiving solar radiation from the sun and converting the solar radiation into heat at least partially positioned at a focal point of the concentrator, and separate from the concentrator;
a thermal storage reservoir separate from the heating chamber;
a heating circuit extending between the thermal receiver and the thermal storage reservoir, wherein a heat transfer medium circulated through the heating circuit is heated by the solar radiation received by the thermal receiver and heat from the heated heat transfer medium is stored in the thermal storage reservoir; and
a heat transfer circuit extending between the thermal storage reservoir and the heating chamber, whereby stored heat from the thermal storage reservoir is transferred to the non-potable liquid contained in the heating chamber.

* * * * *